United States Patent
Yi et al.

(10) Patent No.: US 9,712,262 B2
(45) Date of Patent: Jul. 18, 2017

(54) METHOD AND APPARATUS FOR PERFORMING MEASUREMENT IN WIRELESS COMMUNICATION SYSTEM

(71) Applicant: LG ELECTRONICS INC., Seoul (KR)

(72) Inventors: Yunjung Yi, Seoul (KR); Joonkui Ahn, Seoul (KR); Suckchel Yang, Seoul (KR)

(73) Assignee: LG ELECTRONICS INC., Seoul (KR)

(*) Notice: Subject to any disclaimer, the term of this patent is extended or adjusted under 35 U.S.C. 154(b) by 15 days.

(21) Appl. No.: 14/759,396

(22) PCT Filed: Jan. 9, 2014

(86) PCT No.: PCT/KR2014/000232
§ 371 (c)(1),
(2) Date: Jul. 6, 2015

(87) PCT Pub. No.: WO2014/109561
PCT Pub. Date: Jul. 17, 2014

(65) Prior Publication Data
US 2015/0358094 A1    Dec. 10, 2015

Related U.S. Application Data

(60) Provisional application No. 61/750,756, filed on Jan. 9, 2013, provisional application No. 61/910,960, filed on Dec. 3, 2013.

(51) Int. Cl.
| | |
|---|---|
| *H04B 17/318* | (2015.01) |
| *H04W 48/10* | (2009.01) |
| *H04W 72/08* | (2009.01) |
| *H04W 36/00* | (2009.01) |

(52) U.S. Cl.
CPC ......... *H04B 17/318* (2015.01); *H04W 48/10* (2013.01); *H04W 72/08* (2013.01); *H04W 36/0094* (2013.01)

(58) Field of Classification Search
CPC ............................ H04B 17/318; H04W 24/10
See application file for complete search history.

(56) References Cited

U.S. PATENT DOCUMENTS

| | | | |
|---|---|---|---|
| 2005/0250495 A1 | 11/2005 | Black et al. | |
| 2010/0329220 A1 | 12/2010 | Kim et al. | |

(Continued)

FOREIGN PATENT DOCUMENTS

| | | |
|---|---|---|
| CN | 101960732 A | 1/2011 |
| JP | 2012-531102 | 12/2012 |

(Continued)

OTHER PUBLICATIONS

PCT International Application No. PCT/KR2014/000232, Written Opinion of the International Searching Authority dated Apr. 28, 2014, 1 page.

(Continued)

*Primary Examiner* — Kodzovi Acolatse
(74) *Attorney, Agent, or Firm* — Lee Hong Degerman Kang Waimey

(57) ABSTRACT

A method for and apparatus for performing a measurement in a wireless communication system is provided. A wireless device determines information about a measurement type, the measurement type indicating one of a first measurement object and a second measurement object and performs measurement using a measurement signal at subframe(s) configured in the measurement object indicated by the measurement type. The measurement signal includes one of a discovery signal, a measurement reference signal (MRS) and a cell-common RS (CRS).

20 Claims, 10 Drawing Sheets

(56) References Cited

U.S. PATENT DOCUMENTS

| | | | |
|---|---|---|---|
| 2011/0201332 A1 | 8/2011 | Siomina et al. | |
| 2012/0147734 A1 | 6/2012 | Kim et al. | |
| 2012/0307670 A1* | 12/2012 | Kazmi | H04W 24/10 370/252 |
| 2013/0250882 A1* | 9/2013 | Dinan | H04W 72/0426 370/329 |
| 2013/0294369 A1* | 11/2013 | Dinan | H04L 5/001 370/329 |
| 2013/0322363 A1* | 12/2013 | Chen | H04W 72/042 370/329 |
| 2014/0043988 A1* | 2/2014 | Chen | H04W 24/00 370/252 |
| 2014/0086173 A1* | 3/2014 | Sadeghi | H04L 5/005 370/329 |
| 2014/0112243 A1* | 4/2014 | Suzuki | H04W 56/00 370/328 |

FOREIGN PATENT DOCUMENTS

| | | |
|---|---|---|
| RU | 2372748 C2 | 11/2009 |
| WO | 2008/063109 | 5/2008 |
| WO | 2011000110 A2 | 1/2011 |

OTHER PUBLICATIONS

3rd Generation Partnership Project;, "Technical Specification Group Radio Access Network; Evolved Universal Terrestrial Radio Access (E-UTRA); Requirements for support of radio resource management (Release 11)", 3GPP TS 36.133 V11.2.0, Sep. 2012, 672 pages.

European Patent Office Application No. 14737507.5, Search Report dated Jul. 12, 2016, 14 pages.

New Postcom, "CSI-RS based RRM measurement for synchronised new carriers", 3GPP TSG RAN WG1 Meeting #71, R1-124949, Nov. 2, 2012, 4 pages.

3rd Generation Partnership Project, "Technical Specification Group Radio Access Network; Evolved Universal Terrestrial Radio Access (E-UTRA); Mobility enhancements in heterogeneous networks (Release 11)", 3GPP TR 36.839 V11.1.0, Dec. 2012, 54 pages.

Nokia Siemens Networks et al., "Background search for small cell detection", 3GPP TSG-RAN WG2 Meeting #78, R2-123102, May 24, 2012, 12 pages.

Qualcomm Incorporated, "Inter-frequency Small Cell Identification", 3GPP TSG-RAN2 Meeting #77, R2-120654, Jan. 31, 2012, 2 pages.

Alcatel-Lucent, "Intra-LTE energy saving solution: Cell switch off in a collaborative network.", 3GPP TSG RAN WG3 Meeting #67, R3-100875, Feb. 15, 2010, 4 pages.

3rd Generation Partnership Project, Technical Specification Group Radio Access Network; Evolved Universal Terrestrial Radio Access (E-UTRA); Radio Resource Control (RRC); Protocol specification (Release 11):, 3GPP TS 36.331 V11.2.0, Dec. 2012, 340 pages.

Alcatel-Lucent Shanghai Bell et al., "Network-Assisted Inter-frequency Pico Cell Discovery in LTE HetNets", 3GPP TSG-RAN WG2 meeting #77 bis, R2-121709, Mar. 20, 2012, 4 pages.

* cited by examiner

METHOD AND APPARATUS FOR PERFORMING MEASUREMENT IN WIRELESS COMMUNICATION SYSTEM

CROSS-REFERENCE TO RELATED APPLICATIONS

This application is the National Stage filing under 35 U.S.C. 371 of International Application No. PCT/KR2014/000232, filed on Jan. 9, 2014, which claims the benefit of U.S. Provisional Application Nos. 61/750,756, filed on Jan. 9, 2013 and 61/910,960, filed on Dec. 3, 2013, the contents of which are all hereby incorporated by reference herein in their entirety.

TECHNICAL FIELD

The present invention relates to wireless communications, and more particularly, to a method and apparatus for performing a radio resource management and a measurement in a wireless communication system.

BACKGROUND ART

3rd generation partnership project (3GPP) long term evolution (LTE) is an improved version of a universal mobile telecommunication system (UMTS) and a 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

The commercialization of the 3GPP LTE (A) system is being recently accelerated. The LTE systems are spread more quickly as respond to user's demand for services that may support higher quality and higher capacity while ensuring mobility, as well as voice services. The LTE system provides for low transmission delay, high transmission rate and system capacity, and enhanced coverage.

To increase the capacity for the user's demand of services, increasing the bandwidth may be essential, a carrier aggregation (CA) technology aiming at obtaining an effect, as if a logically wider band is used, by grouping a plurality of physically non-continuous bands in a frequency domain has been developed to effectively use fragmented small bands. Individual unit carriers grouped by carrier aggregation is known as a component carrier (CC). Each CC is defined by a single bandwidth and a center frequency.

A system in which data is transmitted and/or received in a broadband through a plurality of CCs is referred to as a multi-component carrier system (multi-CC system) or a CA environment. The multi-component carrier system performs both a narrow band and a broad band by using one or more carriers. For example, when an each carrier corresponds to a bandwidth of 20 MHz, a bandwidth of a maximum of 100 MHz may be supported by using five carriers.

In order to operate the multi-CC system, various control signals are required between a base station (BS) as an eNB (enhanced Node B) and a User equipment as a Terminal. Also an efficient cell planning for multi-CCs is required. Also various signals or efficient cell planning schemes are required to transmit between the eNB and the UE to support inter-cell interference reduction and carrier extensions. Furthermore, inter-node resource allocation by coordination among eNBs for a UE is also feasible where multi-CC aggregation is achieved over multiple eNBs/nodes. An efficient operation scheme for the cell planning including a new carrier which is necessarily transmitted restricted (or eliminated) controls and UE in a small cell cluster environment needs to be defined from a measurement point.

DISCLOSURE

Technical Problem

The present invention provides a method and apparatus for performing cell management in a wireless communication system.

The present invention also provides a method and apparatus for performing radio resource measurement and report in a wireless communication system.

The present invention provides a method and apparatus for performing radio resource management or radio link management in a wireless communication system.

Technical Solution

In an aspect, a method for performing a measurement in a wireless communication system is provided. The method may include identifying information about a measurement type, the measurement type indicating one of a first measurement object and a second measurement object; and performing measurement using a measurement signal for the measurement object indicated by the measurement type.

The method may further include receiving a measurement configuration from a base station, the measurement configuration including cell information and information about the first measurement object and the second measurement object, the cell information indicating a cell to which the first measurement object or the second measurement object is applied, the first measurement object including a first subframe field and a first measurement resource field, the first subframe field indicating at least one subframe among a plurality of subframes in which the measurement is performed, the first measurement resource field indicating a resource block in which the measurement is performed, the second measurement object including a second subframe field and a second measurement resource field, the second subframe field indicating at least one subframe among a plurality of subframes in which the measurement is performed, the second measurement resource field indicating a resource block in which the measurement is performed.

The method may further include that a measurement type indicates the first measurement object, the cell indicated by the cell information is a discontinuous transmission (DTX) cell for the measurement signal, and when the measurement type indicates the second measurement object, the cell indicated by the cell information is a continuous transmission cell for the measurement signal.

The method may further include that a measurement signal includes one of a discovery signal, a measurement reference signal (MRS) and a cell-common RS (CRS).

In another aspect, a wireless device for performing a measurement in a wireless communication system is provided. The wireless device includes a radio frequency (RF) unit for transmitting and receiving a radio signal; and a processor operatively coupled to the RF unit, wherein the processor is configured for: determining a measurement type indicating a restricted measurement; and performing measurement using a measurement signal at a subframe configured in the restricted measurement according to the measurement type.

Advantageous Effects

This invention provides an enhanced communication system including a new form of a carrier (or cell) to improve interference problems between pluralities of cells. Also this invention provides mechanisms to perform management including a restricted measurement for the new carrier type where Cell specific RS may not be transmitted in every subframe. More details, this invention performs adaptive measurement corresponding to a measurement indicator. Therefore, this invention may keep benefits of battery consumption, Quality of Service (QoS) for UEs in cell-edge and carrier extensibility as well. Thus, more efficient and accurate cell planning and adaptive measurement are supported in this invention.

MODE FOR INVENTION

Figure 1:
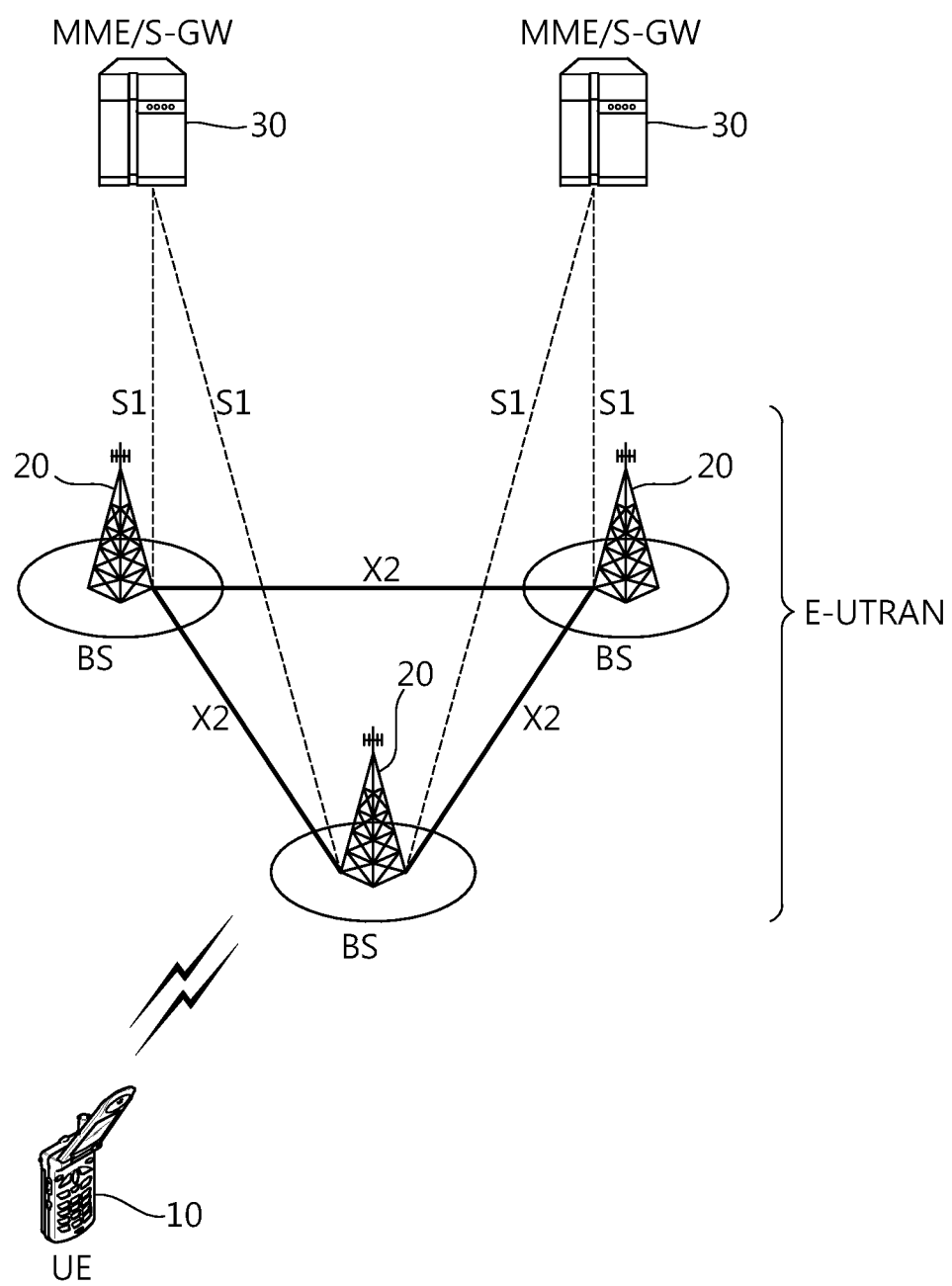
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

Multi-access schemes applied to the wireless communication system are not limited. Namely, various multi-access schemes such as CDMA Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, OFDM-CDMA, or the like, may be used. For uplink transmission and downlink transmission, a TDD (Time Division Duplex) scheme in which transmission is made by using a different time or an FDD (Frequency Division Duplex) scheme in which transmission is made by using different frequencies may be used.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

The wireless communication system of the present invention uses blind decoding for Physical Downlink Control Channel (PDCCH) detection. The blind decoding is a scheme in which a desired identifier is de-masked from a CRC of a PDCCH to determine whether the PDCCH is its own channel by performing CRC error checking. An eNB determines a PDCCH format according to a Downlink Control Information (DCI) to be transmitted to a UE. Thereafter, the eNB attaches a cyclic redundancy check (CRC) to the DCI, and masks a unique identifier (referred to as a radio network temporary identifier (RNTI)) to the CRC according to an owner or usage of the PDCCH. For example, if the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (e.g., P-RNTI)) may be masked to the CRC. If the PDCCH is for system information (more specifically, a system information block (SIB) to be described below), a system information identifier and system information RNTI (e.g., SI-RNTI) may be masked to the CRC. To indicate a random access response that is a response for transmission of a random access preamble of the UE, a random access-RNTI (e.g., RA-RNTI) may be masked to the CRC.

Figure 2:
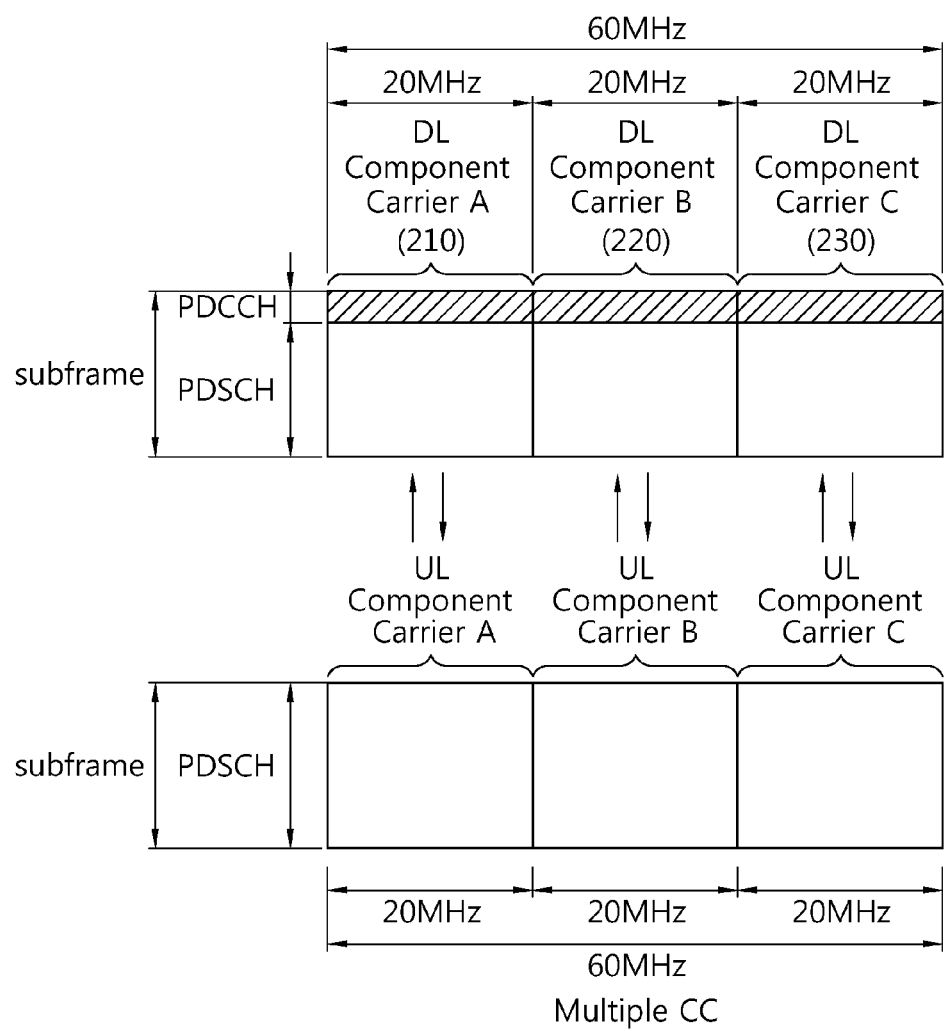
FIG. 2 shows an exemplary concept for a carrier aggregation (CA) technology according to an exemplary embodiment of the present invention.

FIG. 2 shows an exemplary concept for a carrier aggregation (CA) technology according to an exemplary embodiment of the present invention.

Referring to FIG. 2, the DL/UL subframe structure considered in 3GPP LTE-A (LTE-Advanced) system where multiple CCs are aggregated (in this example, 3 carriers exist) is illustrated, a UE can monitor and receive DL signal/data from multiple DL CCs at the same time. However, even if a cell is managing N DL CCs, the network may configure a UE with M DL CCs, where $M \leq N$ so that the UE monitoring of the DL signal/data is limited to those M DL CCs. In addition, the network may configure L DL CCs as the main DL CCs from which the UE should monitor/receive DL signal/data with a priority, either UE-specifically or cell-specifically, where $L \leq M \leq N$. So the UE may support one or more carriers (Carrier 1 or more Carriers 2 . . . N) according to UE's capability thereof.

Hereinafter, a CC may be divided into a primary component carrier (PCC) and a secondary component carrier (SCC) depending on whether or not they are activated. A PCC is a carrier which is constantly activated, and an SCC is a carrier which is activated or deactivated according to particular conditions. Note that there may be one or more special SCC (e.g., namely Super SCC) which may not be activated or deactivated, rather which are constantly activated similar to PCC. Here, activation refers to a state in which traffic data is transmitted or received or a state in which traffic data is ready to be transmitted or received. Deactivation refers to a state in which traffic data cannot be transmitted or received and measurement or transmission or reception of minimum information is available. Furthermore, the PCC and/or Super SCC can be also activated or deactivated using an indication of activation/Deactivation as a bit. The UE can camp on the PCC as a Primary serving cell (Pcell) at first in initial access. The UE may use only one primary component carrier or one or more secondary component carriers along with a primary component carrier. The UE may be allocated with a primary component carrier and/or a secondary component carrier from the BS. Note that when inter-node resource aggregation is achieved, the UE may be configured with Super SCC which is functioning similar to PCC as well as potentially secondary component carrier(s) from another BS.

A PCC and/or Super SCC is a carrier by which primary control information items are exchanged between a BS and an UE. An SCC is a carrier allocated according to a request from an UE or an instruction from a BS. A PCC and/or Super SCC may be used for an UE to enter a network and/or may be used to allocate an SCC. A PCC and/or Super SCC may be selected from among entire set carriers, rather than being fixed to a particular carrier. A carrier set as an SCC may also be changed into a PCC or Super SCC depending on inter-node resource aggregation scenario/setup.

As described above, a DL CC may construct one serving cell, and the DL CC and a UL CC may construct one serving cell by being linked with each other. Further, a primary serving cell (PCell) corresponds to a PCC, and a secondary serving cell (SCell) corresponds to an SCC. Each carrier and combination of carriers may also be referred to as each one serving cell as a PCell or a SCell. That is, the one serving cell may correspond to only one DL CC, or may correspond to both the DL CC and the UL CC.

A Pcell is a resource in which the UE initially establishes a connection (or a RRC connection) among several cells. The Pcell serves as a connection (or RRC connection) for signaling with respect to a plurality of cells (CCs), and is a special CC for managing UE context which is connection information related to the UE. Further, when the Pcell (PCC) establishes the connection with the UE and thus is in an RRC connected mode, the PCC always exists in an activation state. A SCell (SCC) is a resource assigned to the UE other than the Pcell (PCC). The SCell is an extended carrier for additional resource assignment, etc., in addition to the PCC, and can be divided into an activation state and a deactivation state. The SCell is initially in the deactivation state. If the SCell is deactivated, it includes not transmit SRS on the SCell, not report CQI/PMI/RI/PTI for the SCell, not transmit on UL-SCH on the SCell, not monitor the PDCCH on the SCell, not monitor the PDCCH for the SCell. The UE receives an Activation/Deactivation MAC control element in this TTI activating or deactivating the SCell.

A MAC control element including an activation indicator has a length of 8 bits, is used for activation for each serving cell. Herein, a Pcell is implicitly regarded as being activated between the UE and the eNB and, thus the Pcell is not additionally included in the activation indicator. An index of the Pcell is always given a specific value, and it is assumed herein that the index is given 0. So the Scells are indexed with 1, 2, 3, . . . , 7 for a serving cell index 1 corresponds to a $7^{th}$ bit from the left, which are the remaining indices other than 0, i.e., the index of the Pcell. Herein, the index of the serving cell may be a logical index determined relatively for each UE, or may be a physical index for indicating a cell of a specific frequency band. And the CA system supports a non-cross carrier scheduling (self-carrier scheduling) or, cross carrier scheduling.

In LTE system, FDD DL carrier subframe or TDD DL subframe starts with a few symbols of control channels such as PDCCH, PHICH and PCFICH and use the rest symbols to transmit PDSCH. The number of OFDM symbols used for control channels can be dynamically indicated by PCFICH or semi-statically by RRC signaling to UE. That is, CRS and control channels, such as PCFICHs/PDCCHs/PHICHs over some OFDM symbol(s) of the former part, are transmitted through all DL subframes for a specific new carrier other than a DL subframe configured for a special purpose e.g., an MBSFN. Accordingly, backward compatibility for access by existing UE and for providing service to existing UE can be guaranteed. In addition to, for the next LTE system or enhanced communication system, a new form of a carrier or cell may be introduced in which all or some of the proposed backward compatible legacy signals and/or channels are not transmitted for reasons of the improvement of an interference problem between a plurality of cells, the enhancement of carrier extensibility, and an increase in the degree of freedom in providing advanced features (e.g., 8Tx MIMO).

The present invention includes that a carrier is defined as a cell with new carrier form with an optimized type to transmit a Reference Signal (RS) or control channels. The DL resources can be efficiently used by improving the performance of DL reception and minimizing RS overhead through the reception of DM-RS-based DL data transmitted in a UE-specific way (i.e., precoded) and the measurement of a channel status based on a configurable CSI-RS having relatively low density, instead of omitting or significantly reducing fixed CRS transmission having high density i.e., the reception of DL data and the measurement of a channel status dependent on the CRS transmission basically in a new cell. Accordingly, a method of performing DL data scheduling using a new cell may be taken into consideration by managing legacy RSs, that is, configured as the DL Transmission Mode (TM) of UE to which an new carrier has been allocated, in particular, only TMs (e.g., TM mode 8 or 9) based on a DM-RS, from among the above-defined DL TMs. Also, synchronization/tracking and various types of measurement may need to be performed on a new carrier for efficiency. That is, there is a need of a new carrier for an efficient cell planning since the Pcell is completely saturated with transmitting and receiving control signals and reference signals between eNB and UE, also the Pcell needs more resources to control the UE with one more Scells for CA.

Furthermore, this invention provides that an enhanced PDCCH (ePDCCH) can be one of solutions of limitation for a PDCCH transmission or new control information transmission of near future commination system including a new type of carrier. The ePDCCH which is multiplexed with PDSCH can be employed as shown in FIG. 3 to support multiple Scells of the CA.

Figure 3:
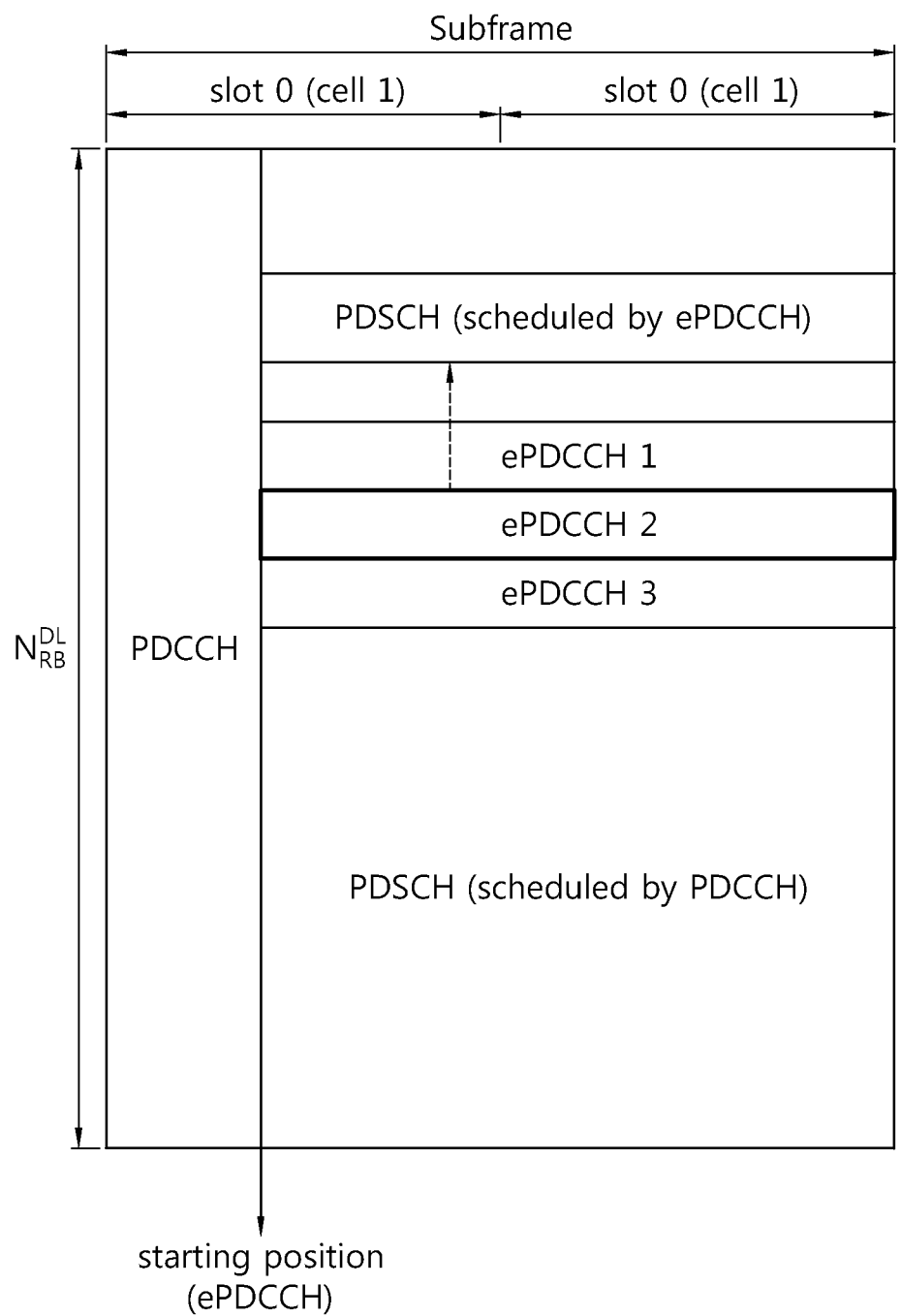
FIG. 3 shows a structure of a downlink controls to which the present invention is applied.

Referring to FIG. 3, the ePDCCH can be placed in data region which conveys control information. So, the UE can monitor a plurality of PDCCH/ePDCCHs within the control region and/or data region. As the PDCCH is transmitted on CCE, ePDCCH can be transmitted on eCCE (enhanced CCE) as an aggregation of some contiguous CCEs, the eCCE corresponds to a plurality of REGs. If ePDCCH is more efficient than PDCCH, it is worthwhile to have subframes where only ePDCCHs are used without PDCCHs. The PDCCHs and new ePDCCH only subframes, or have only ePDCCH only subframes can be in a new type of carrier as NC which has both legacy LTE subframes. It is still assumed that MBSFN subframes exist in a new carrier NC. Whether to use PDCCH in MBSFN subframes in NC and how many ODFM symbols will be allocated if used can be configured via RRC signaling. Further TM10 and new TM can be considered for new carrier type as well. Hereafter, new carrier type refers to a carrier where all or part of legacy signals can be omitted or transmitted in different manners. For example, a new carrier may refer a carrier where CRS may be omitted in some subframes or PBCH may not be transmitted. A new carrier may not mean that Rel-11 and below UEs may not be able to access the carrier. However, it is expected that Rel-11 and below UEs may not achieve the same performance compared to legacy carrier due to a certain features lacking such as continuous CRS transmission.

The UE firstly determine the modulation order and transport block size(s) in the physical downlink shared channel by reading the 5-bit modulation and coding scheme/redundancy version field in a DCI. But a new carrier may not carry legacy PDCCH, and thus ePDCCH and PDSCH may start the first OFDM symbol in each subframe. For a new carrier, two approaches can be needed. One approach is to eliminate CRS and PDCCH entirely from transmission and thus all subframes are operated based on DM-RS and ePDCCH. Another approach is to allow occasional CRS and PDCCH transmission such that subset of subframes may carry CRS and PDCCH or may carry discovery signals and PDCCH. When CRS and PDCCH are not transmitted, it can be assumed that ePDCCH and PDSCH may start at the first OFDM symbol. Thus, the starting OFDM symbol may change subframe-by-subframe or changed semi-statically or decided implicitly based on some other signals or configurations such as restricted measurement set where restricted measurement set 0 would be assumed as carrying CRS and restricted measurement set 1 would be assumed as not carrying CRS/PDCCH and thus ePDCCH/PDSCH may start at the first OFDM symbol.

Furthermore, for an efficient operation for a dense hot spot small cell deployment, it can be further considered turning on/off cells rather dynamically or semi-statically. It can be assumed that discovery signals which may have different periodicity and/or resource from the currently existing PSS/SSS/CRS or CSI-RS can be transmitted which will be used for cell identification and/or measurement. Proposal of this invention can be applicable to the case where cell on/off is performed and then discovery signals are transmitted. It can be assumed that invention applied to TRS/CRS can be applied to discovery signals without loss of generality. TRS refers reference signals used for time/frequency tracking (tracking RS).

As described, in the new carrier, a special subframe may not have legacy PDCCH and starts PDSCH at first OFDM symbol, the number of OFDM symbols used in PDSCH in special subframe is increased to 8-11 from 7-10 in normal CP. When the number of OFDM symbols is equal to or greater than 11 which is the basis of TBS calculation in normal subframe in normal carrier, the scaling factor may be increased to 1. Furthermore, this invention proposes to use OFDM symbol 0, 1 for CSI-RS REs. The CSI-RS can be used for Radio Resource Management (RRM), fine time/frequency tracking and/or interference measurement. In small cell environments where small cells are densely deployed, the CSI-RS in current specification (LTE Rel-10/11 specification) may not be sufficient to perform those functions as there are a large number of neighbor small cells which like to use orthogonal resources.

For this next LTE system or enhanced communication system, this invention provides that the new carrier cell may be introduced in which all or some of the proposed backward compatible legacy signals and/or channels are not transmitted for reasons of the improvement of an interference problem between a plurality of cells, the enhancement of carrier extensibility, and an increase in the degree of freedom in providing advanced features. Even though the proposed invention is mainly described for the new carrier cell as an example, it does not limit to the new carrier cell only. It can be applied to legacy carriers without the loss of generality as well. More details, this invention considers cases where cell-specific RS used for tracking and RRM measurement would not be transmitted at all or transmitted only a subset of subframes different from legacy carrier. For a convenience, this invention shows an example where CRS or tracking RS is transmitted every 5 msec (e.g., subframe #0 and #5 in each radio frame). More particularly, a new carrier may refer a carrier which performs cell on/off where eNB turns off transmissions upon no active UE attached or based on a pattern. If this is assumed, this invention shows an example where PSS/SSS/CRS or a discovery signal based on CSI-RS is transmitted every T msec with a predetermined value (e.g., T=200).

For this LTE system which this invention is applied, three restricted measurement patterns can be used as following. A Pattern1 is for a restricted measurement of RLM and RRM on the serving cell that applies only to PCell, a Pattern 2 is for a restricted measurement of RRM on certain intra-frequency neighbor cells indicated by PCI, and a Pattern 3 is for a restricted CSI measurement.

This invention considers RRM cases where a new carrier is used either as a SCell associated with a legacy carrier PCell or a PCell as a stand-alone operation with an assumption that CRS or tracking RS would be transmitted a subset of subframes in each radio frame or a discovery signal is transmitted in a subset of subframes periodically.

When a discovery signal is transmitted less frequently than 40 msec or maximum duration that MeasSubframePattern in 200 msec, then a new Measurement subframe pattern may be necessary. It is desirable to configure a bitmap of radio frame with starting offset for radio frame and also starting offset for subframe index. For example, a bitmap of 40 bits can represent 400 msec and the starting SFN and subframe offset can be also configured where discovery signal is transmitted.

Herein, the RRM measurement is mainly for hand-over procedure and/or measurement of the quality of serving cell and neighbor cells. The main motivation of having a restricted measurement in legacy carrier is to support accurate or better measurement results when almost blank subframe (ABS) technique is applied such that RRM measurement on the serving cell may be occurred only when ABS is configured for the interferer.

This invention considers a case where subframe configured in a restricted measurement set may not carry CRS due to new carrier type or cell on/off function or other reasons, this invention proposes techniques to address how to perform RRM and/or RLM in such cases.

Even though the invention is mainly targeted for new carrier type, it can be applied to legacy carrier and/or any other wireless technology where applicable. A new carrier type may be defined as a carrier which may not support Rel-11 or below LTE UEs due to the lack of legacy control and/or signals. For instance, legacy UEs are expecting to receive cell-common RS in every subframe where a new carrier may not transmit cell-common RS because of overhead reduction or cell off function. It is also feasible to introduce new RS used for measurement such as CSI-RS. This invention shows that this RS as MRS (Measurement RS) which can refer any RS used for UE measurement. When measurement RS or discovery signal is introduced with cell on/off, some network assistance to assist UE to locate measurement RS or discovery signal can be considered.

One of the reason of network assistance is necessary is because a cell performing on/off may transmit discovery signal which should not be detectable by legacy UEs for better performance of legacy UEs, and thus information on additional/separate discovery signal to detect the cell may be necessary. Another reason of network assistance is to enhance the efficiency of cell detection and measurement where a UE may be able to detect many cells in a short time frame so that it can save energy and reduce interruption time. One example of network assistance can be considered based on MeasObjectEUTRA (measurement object) where a UE is supposed to perform measurement following the configuration as Table 1.

Firstly, which RS will be used for measurement needs to be signaled unless the same PSS/SSS/CRS is used for discovery signal and thus measurement RS is always assumed to be CRS. Or, the type of measurement (Rel-12 advanced measurement or Rel-11 legacy measurement) type may be indicated instead of measurement RS type. If there are different neighbors where some neighbor cells support Rel-12 advanced measurement whereas some neighbor cells support legacy mechanisms only, two sets of measurementObject can be configured that?one for legacy mechanism and the other for Rel-12 advanced measurement for the same frequency. If two sets are configured, reports can be accomplished separately as well. Or, aggregated measurement report is also feasible where the measurement type is determined or selected per neighbor cell depending on whether neighbor cell carrier type or functionality (e.g., whether advanced discovery mechanism is supported or cell on/off is performed).

If discovery or measurement RS is transmitted, the bandwidth of MRS can be configurable. Thus, network indication on the bandwidth or MRS is necessary. One example is to use "allowedMeasBandwidth" to indicate the bandwidth of MRS transmission. Actual transmission bandwidth of MRS may be larger than allowedMeasBandwidth. However, a UE will perform the measurement on MRS per "allowedMeasBandwidth".

Alternatively, separate configuration for each measurement target cell is also feasible. If separate configuration is performed, it may include all or partial set from the followings as Table 2.

TABLE 1

```
MeasObjectEUTRA ::=        SEQUENCE {
    measType               MeasurementType,
    carrierFreq            ARFCN-ValueEUTRA,
    allowedMeasBandwidth   AllowedMeasBandwidth,
    presenceAntennaPort1   PresenceAntennaPort1,
    neighCellConfig        NeighCellConfig,
    offsetFreq             Q-OffsetRange        DEFAULT dB0,
    -- Cell list
    cellsToRemoveList      CellIndexList        OPTIONAL,
    -- Need ON
    cellsToAddModList      CellsToAddModList    OPTIONAL,
    -- Need ON
    -- Black list
    blackCellsToRemoveList CellIndexList        OPTIONAL,
    -- Need ON
    blackCellsToAddModList BlackCellsToAddModList OPTIONAL,
    -- Need ON
    cellForWhichToReportCGI PhysCellId          OPTIONAL,
    -- Need ON
    ...,
    [[measCycleSCell-r10   MeasCycleSCell-r10   OPTIONAL,
    -- Need ON
      measSubframePatternConfigNeigh-r10
      MeasSubframePatternConfigNeigh-r10    OPTIONAL -
- Need ON
    ]],
    [[widebandRSRQ-Meas-r11  BOOLEAN     OPTIONAL -
- Cond WB-RSRQ
    ]]
}
```

Herein, the MeasurementType can be set as BOOLEAN, where {legacy measurement, advanced measurement}. This MeasurementType is to differentiate UE behavior on legacy measurement versus enhanced measurement such as using discovery signal or measurement RS.

Figure 4:
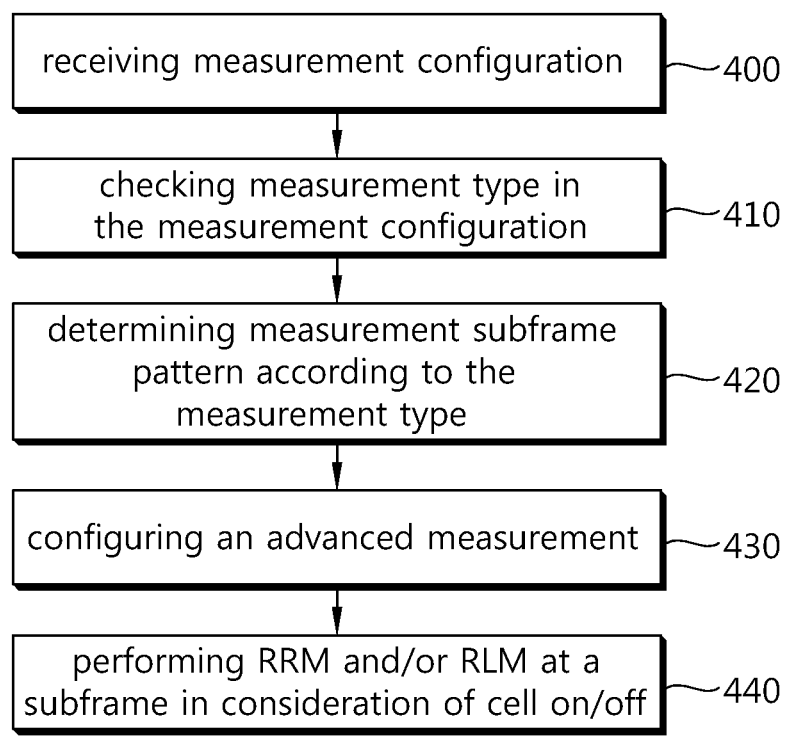
FIG. 4 shows an exemplary time flow for performing management according to a management type as exemplary embodiment of the present invention.

TABLE 2 measurement signal type
measurement signal transmission bandwidth and/or frequency/PRBs of MRS transmission
measurement signal transmission period and/or offset TABLE 2-continued cell ID and/or cluster ID and/or unique ID used for discovery signal scrambling
number of antenna ports and/or antenna ports used
SFN offset if any
timing offset if any
the number of subframes in each interval carrying measurement RS As described, FIG. 4 shows an exemplary flow chart for performing management according to an exemplary embodiment of the present invention.

Referring to FIG. 4, a UE performs management by determining a measurement type indicating a restricted measurement and measuring a measurement signal at a configured subframe for the restricted measurement according to the measurement type. For the measurement, the UE receives a measurement configuration including an advanced measurement object for the restricted measurement and a legacy measurement object as a set, or separately receives each configuration for the measurements (400).

Thus the UE can check at least one of a measurement signal type, a measurement signal transmission period and/or offset, a cell ID of the target cell, a number of subframes in a measurement RS, a bandwidth, frequency, and PRBs for the measurement signal transmission (410), here the measurement signal includes a discovery signal or a measurement RS. The measurement type can be set by a cell depending on whether the cell is on state or off state, and the cell functionality is new or legacy (420). Wherein the MRS or the discovery signal is received at a bandwidth predetermined according to a measurement target cell. So the UE configures an advanced measurement according to the target cell (430) and measure a measurement of RRM and/or RLM in consideration of target cell on/off by the measurement configuration (440).

In other words, this invention provides mechanisms to perform radio resource management related measurement and report in new carrier type where Cell specific RS may not be transmitted in every subframe. For this, RRM measurement at SCell with new carrier or a cell with on/off is described. A UE of this invention supports a procedure to attach a SCell as performing (1) configuration of a SCell (2) RRM measurement (3) activation of the SCell. As the new carrier may not carry CRS or Tracking RS (TRS) or MRS in every subframe, the RRM measurement would be occurred only for subframes carrying TRS or CRS or MRS. Potentially the following mechanisms are feasible to support this invention.

At configuration of a SCell, it needs to indicate the carrier type and/or necessary CRS/TRS/MRS transmission periodicity and offset (if periodicity and offset changes) and/or CRS/TRS/MRS transmission bandwidth (if not the whole bandwidth). If this applies, UE shall assume that regardless of RRM measurement configuration RRM measurement on the configured SCell occurs in subframes and subcarriers carrying CRS/TRS/MRS. Alternatively, a UE may assume that MRS will be transmitted in the subframes configured for a restricted measurement set unless configured or indicated otherwise. This, however, requires supporting of restricted measurement set in SCell as well.

Additional restricted measurement of RRM (and RLM) on the configured SCell is configured so that the UE shall perform RRM (and RLM) on the configured restricted subframes only. In this case, one set per each SCell can be configured or one set for all SCells belonging to the SeNB (assisting eNB in dual connectivity) can be configured. Or one set can be configured for SeNB PCell-like cell and another set for each SCell can be configured. In this case, the set for PCell-like cell would be used for discovery signal based measurement whereas other sets can be used for CRS-based measurement.

Allow RRM based on CSI-RS such that RRM measurement would occur only based on CSI-RS configured for the configured SCell. Note that this also applies to discovery signals if defined such as based on CSI-RS to support fast-time scale cell on/off. In other words, regardless of restricted measurement, if discovery signal is introduced, measurement can be performed on discovery signals.

In addition to, when configuration of the SCell is configured, eNB indicates the RS used for RRM measurement either by CRS/TRS or CSI-RS or other RS used for MRS. If eNB configures to use CRS/TRS, UE shall use subframes/subcarriers which carry CRS/TRS based on the configuration or new carrier type specification. If eNB configures to use CSI-RS, UE shall use configured CSI-RS resources for RRM measurement/report. If eNB configures to use MRS, UE shall use configured MRS resources for RRM measurement. Without eNB configuration, UE may perform RRM measurement based on both CRS and MRS if MRS is different from CRS. UE may report only results which UE can successfully perform the measurement. For example, if a UE is able to perform measurement based on CRS, measurement report on CRS is reported. If a UE is able to perform measurement based on MRS, measurement report on MRS is reported. If configured, a UE can report both measurement reports as well. Without eNB assistance, it may be assumed that a UE blindly tries to search MRS and/or CRS.

Or, Fix RRM measurement on subframes which carry PSS/SSS or a fixed subset can be used. For example, if PSS/SSS are carried every 5 msec, RRM measurement without any additional configuration would be performed in subframes carrying PSS/SSS (and maybe in the center 6RB). Or another example is to perform measurement on subframe #0/#5 in every radio frame over center 6RB or center 25RB or the whole system bandwidth. This would be useful when network assistance on measurement signals is not provided and UE knows the configuration of measurement RS in prior. For example, if discovery signal is transmitted in every 200 msec, UE may search discovery signal in center 6RB in every 200 msec with default configuration/assumptions.

Further, to support intra-frequency RRM measurement on neighbor new type (NCT) carriers (or new cells with new carrier type), restricted RRM measurement is feasible if PCI of the NCT carrier is known to the serving cell. Or, if the serving cell may expect to have one or more NCT carriers in the intra-band, it may trigger a NCT RRM for the intra-band RRM measurement. When the NCT RRM is triggered, UE is expected to perform RRM measurement on subframes/subcarriers which carry PSS/SSS and/or CRS/TRS. The UE shall ignore RBs which the UE cannot successfully decode PSS/SSS and/or CRS/TRS. Or, if NCT RRM is triggered, UE is expected to monitor only subframe #0/#5, or predetermined subframes carrying CRS/TRS/MRS for RRM measurement for each carrier. If discovery or measurement RS is transmitted periodically, if RRM is triggered, UE is expected to monitor subframes where discovery or measurement RS is transmitted. Alternatively, RRM request may carry cell type (legacy carrier or new carrier type) where new carrier type implies that UE shall perform RRM on subframes/RBs carrying CRS/TRS/MRS.

Whereas, when Inter-frequency RRM Measurement is applied, a restricted RRM measurement configuration is not supported for inter-frequency RRM measurement, that is, inter-frequency RRM measurement on NCT carriers may be achievable by the following approaches.

(1) NCT RRM trigger for inter-frequency RRM: when it is triggered, UE shall assume that inter-frequency RRM is restricted only to a predetermined subset of subframes or subframes carrying CRS/TRS/MRS same as to intra-frequency RRM measurement.

(2) UE ignores subframes where UE does not decode CRS/TRS/MRS (3) UE takes RRM on subframes which carry PSS/SSS assuming PSS/SSS and TRS/CRS are present in the same subframe. In TDD, UE takes RRM on subframes which carry SSS assuming SSS and TRS/CRS are present in the same subframe.

For neighbor cell RRM measurement, a cell type can be identified by reading PSS/SSS or MIB or SIB or the presence of CRS/TRS/MRS in every subframe or the presence of DM-RS in PBCH decoding or the location of PBCH, etc. Once the UE identifies the cell type, it can be used to infer the location of TRS/CRS/MRS for RRM measurement or RRM RS (such as CSI-RS or CRS/TRS).

When the restricted RRM measurement is configured, if UE is not able to detect any CRS/TRS/MRS on the restricted measurement subframe, it shall ignore the subframe for RRM measurement. Or, eNB transmits CRS/TRS/MRS and/or CSI-RS depending on the RS used for RRM at subframe for the RRM measurement. Unless wide-band RSRQ is enabled, additional CRS/TRS and/or CSI-RS would be limited to center 6RB or measurement bandwidth as AllowedMeasBandwidth.

Meanwhile, the simplest way to support RRM on NCT is to add UE assumption that UE shall ignore subframes where UE does not detect CRS/TRS/MRS successfully for RRM measurement. Or, UE should not assume to receive CRS/TRS/MRS except for subframes configured for the restricted measurement. Another approach is to add assumption that UE shall take RRM measurement on subframes carrying PSS and/or SSS assuming PSS and/or SSS and TRS/CRS are present in the same subframe. This assumption may be applicable only when NCT RRM is triggered. Another approach is to add assumption that UE shall take RRM measurement on subframes carrying discovery signals. Another option is to allow only intra-frequency RRM measurement on NCT carriers by configuring restricted measurement set. For inter-frequency RRM measurement, the RRM report for a NCT carrier may not be accurate as UE may take samples randomly which will not be used for eNB filtered based on PCI. This way does not add any UE assumption or different behavior for neighbor cell RRM. For SCell NCT, it may still require additional support on RRM measurement to handle non-contiguous CRS/TRS/MRS transmission.

When periodic discovery signal transmission is considered, there are two possibilities for legacy measurement signals such as CRS. One way is to skip transmission of legacy measurement signals, and the other way is to transmit legacy measurement signals as well. When second approach is used, an advanced UE may read both measurement RS as well as legacy measurement signals. In this case, UE may assume measurement RS has higher priority over legacy measurement signals such that the measurement with MRS will be used for measurement report with higher priority. This priority may be limited to UEs in RRC_CONNECTED mode such that legacy measurement signals will have higher priority over measurement RS in RRC_IDLE state. In other words, a UE should perform any measurement based on legacy measurement signals in RRC_IDLE mode whereas MRS can be used with higher priority once UE is connected to a cell. Or, which RS used for measurement may be higher-layer configured.

Herein, a definition of RSRP over TRS or discovery signal in this invention can be defined as following Table 3.

TABLE 3

| | |
|---|---|
| Definition | Reference signal received power (RSRP), is defined as the linear average over the power contributions (in [W]) of the resource elements that carry cell-specific reference signals or tracking reference signals or measurement reference signals within the considered measurement frequency bandwidth if CRS is used or min {RSSI measurement bandwidth, TRS bandwidth} if TRS is used or min {RSSI measurement bandwidth, MRS bandwidth} if MRS is used. For RSRP determination the cell-specific reference signals $R_0$ or tracking reference signals shall be used. If the UE can reliably detect that $R_1$ is available it may use $R_1$ in addition to $R_0$ to determine RSRP. If MRS is used, reference signal with antenna port 0 may be assumed as a baseline for measurement. The reference point for the RSRP shall be the antenna connector of the UE. UE is not expected to measure RSRP over subframes without transmitted CRS/TRS If measurement RS is used, UE is not expected to measure RSRP over subframes without transmitted MRS. If receiver diversity is in use by the UE, the reported value shall not be lower than the corresponding RSRP of any of the individual diversity branches. |
| Applicable for | RRC_IDLE intra-frequency (applicable for CRS/TRS based measurement), RRC_IDLE inter-frequency (applicable for CRS/TRS based measurement), RRC_CONNECTED intra-frequency, RRC_CONNECTED inter-frequency |

And a definition of RSRQ over TRS or discovery signal in this invention can be defined as following Table 4.

TABLE 4

| | |
|---|---|
| Definition | Reference Signal Received Quality (RSRQ) is defined as the ratio N × RSRP/(E-UTRA carrier RSSI), where N is the number of RB's of the E-UTRA carrier RSSI measurement bandwidth if CRS is used or the number of RB's of the min {RSSI measurement bandwidth, TRS bandwidth} if TRS is used or min {RSSI measurement bandwidth, MRS bandwidth} if MRS is used. The measurements in the numerator and denominator shall be made over the same set of resource blocks E-UTRA Carrier Received Signal Strength Indicator (RSSI), comprises the linear average of the total received power (in [W]) observed only in OFDM symbols containing reference symbols for antenna port 0 or containing tracking reference signals, in the measurement bandwidth if CRS is used or in the min {measurement bandwidth, TRS bandwidth} if TRS is used or min {RSSI measurement bandwidth, MRS bandwidth} if MRS is used, over N number of resource blocks by the UE from all sources, including co-channel serving and non-serving cells, adjacent channel interference, thermal noise etc. When unrestricted RSRQ measurement is used, UE is not expected to measure RSRP over subframes without transmitted CRS/TRS/MRS. If higher-layer signaling indicates certain subframes for performing RSRQ measurements, then RSSI is measured over all OFDM symbols in the indicated subframes. The reference point for the RSRQ shall be the antenna connector of the UE. If receiver diversity is in use by the UE, the reported value shall not be lower than the corresponding RSRQ of any of the individual diversity branches. |
| Applicable for | RRC_IDLE intra-frequency (applicable for CRS/TRS based measurement), RRC_IDLE inter-frequency (applicable for CRS/TRS based measurement), RRC_CONNECTED intra-frequency, RRC_CONNECTED inter-frequency |

Also the RSRQ can be calculated using the RSRP and RSSI from the same subframe and same resource blocks. The received signal strength indicator (RSSI) is a measurement of the power present in a received radio signal. When TRS is transmitted periodically, there might be some needs to relax this constraint.

(1) Alt1: When a UE is trying to measure RSRQ in a subframe, it detects no TRS/CRS/MRS as NCT does not transmit CRS/TRS in that subframe or the subframe is absent of TRS/CRS/MRS, UE may not measure RSRP, yet it still may measure RSSI. In this case, either UE shall use OFDM symbols carried TRS/CRS/MRS (e.g., OFDM symbol 0, 4 in each slot) or UE may use all OFDM symbols to measure RSSI. RSRQ is calculated as N*RSRP (from the most recent RSRP)/RSSI (measured in this subframe).

(2) Alt2: Restricted measurement applies only to RSSI. In other words, even without TRS/CRS/MRS in the restricted subframe, UE still measure RSSI (either in OFDM symbol 0/4 in each slot or over all OFDM symbols). RSRP can be measured only in subframes which are belonging to the TRS/CRS/MRS subframes and restricted RRM subframes. Or, alternatively, RSRP can be measured regardless of restricted RRM subframes on TRS/CRS/MRS carried subframes. RSRQ is calculated as N*RSRP (from the most recent RSRP)/RSSI (measured in this subframe).

(3) Alt3: Configure a separate restricted RSSI measurement subframes which will be used to measure RSSI where the restricted RRM/RLM subframes will be used only for RSRP. RSRQ is measured over the restricted RRM/RLM subframes. RSRQ is calculated as N*RSRP (measured in this subframe)/average over measured RSSIs up to this subframe from the last RSRQ. Or, RSSI and RSRP restricted subframes can be configured separately where RSRQ (follows RSRP restriction) is calculated as N*RSRP (measured in this subframe)/RSSI (from the most recent measurement).

Alternatively, RSRP and RSSI can be measured and reported separately. Measurement bandwidth for RSRP and RSSI can be configured separately additionally if needed.

Moreover, multiple restricted RRM measurement sets can be configured that the multiple restricted RSRP and/or RSSI measurement sets can be configured separately as well, such that measurement per each set will be reported respectively. Furthermore, UE may assume that RSRP and RSSI should be measured in different subframes or different resource blocks.

Figure 5:
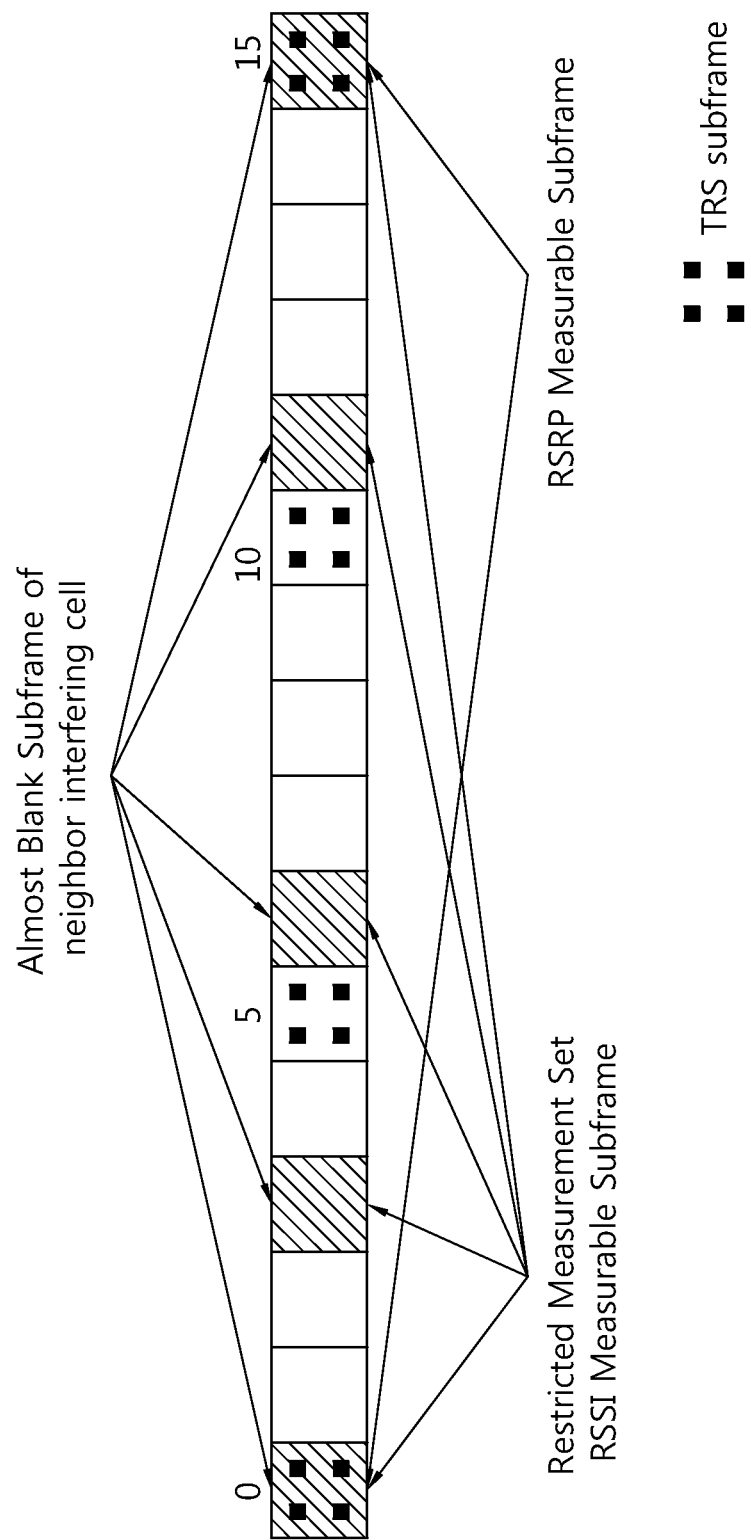
FIG. 5 shows an exemplary restricted measurement set as exemplary embodiment of the present invention.

When ABS is applied, the RRM Measurement on NCT can be performed as FIG. 5. The FIG. 5 shows an exemplary ABS and TRS Subframes according to an exemplary embodiment of the present invention.

As shown in FIG. 5, when ABS is configured, a restricted subframe (or restricted subframes) for RRM (and RLM) would be configured for better measurement. For example, #0/#3/#6/#11/#15 are configured as ABS of the interferer such that UE is expected to measure RRM on those subframes. As TRS would be transmitted in a subset of subframes, some ABS subframes may not carry CRS/TRS which may not be usable for RSRP measurement.

As explained before, overall three approaches are feasible to handle this situation.

(1) eNB makes sure that only subframes carrying CRS/TRS (or CSI-RS) and ABS can be contained in the restricted measurement set. For example, #0/#15 belong to the restricted measurement set in FIG. 5.

(2) UE may ignore subframes at least for RSRP which does not carry CRS/TRS (or CSI-RS). Either by decoding of CRS/TRS (or CSI-RS), or by identifying the cell type, the UE can ignore subframes at least for RSRP.

(3) eNB transmits additional TRS/CRS or CSI-RS in subframes for ABS and configured for the restricted measurement set.

(4) Another approach is to configure separate restricted measurement set if discovery signal is transmitted. For example, first set can be used for restricted measurement based on CRS/TRS for ABS configuration and the second set can be used for measurement based on discovery or measurement RS.

This invention shows an Interference Measurement for Aperiodic CSI or periodic CSI report. If a UE is configured with one or more set of interference measurement resource (IMR) via zero-power CSI configurations or CSI-IMs indexed $IMR_0$ to $IMR_k$. The UE is expected to use interference measurement for CSI calculation using one or more IMR if configured. For the CQI calculation, two approaches are feasible.

One is that the UE can configure a number of CSI processes where each CSI process consists of <a non-zero-power CSI-RS configuration, an IMR> and activates a few CSI processes for the active measurement. The other is that the UE can configure a non-zero-power CSI configuration and configure multiple IMR configurations and the association between NZP CSI-RS and IMR may change dynamically via higher layer signaling or DCI indication. When a UE is configured with multiple ZP CSI-RS configurations or IMR configurations, UE is expected to measure the interference for each ZP CSI-RS configuration or IMR configuration separately such that one or more interference measurements (i.e., interference from one or more ZP CSI-RS or IMR can be selected dynamically to estimate CQI.

For periodic CSI report if restricted measurement sets are configured, IMR can be defined per each restricted measurement set. For example, if two sets are configured as CSI0 and CSI1, the same or different IMR can be configured per each CSI set. When there is only one IMR is configured, UE shall assume the same configuration is applied to all CSI sets unless configured otherwise.

For aperiodic CSI report, a higher layer signaling can be given to associate the IMR for the NZP CSI-RS which will be used for aperiodic CSI report or dynamic indication via DCI (uplink grant) can be used. For example, the maximum number of IMRs is 8, three bits can be added into uplink grant DCI (if dynamic IMR mapping is enabled which may be a UE capability and can be configured by higher layer to enable) where each value maps to the index of configured IMRs which are used for interference measurement for the CSI calculation. The number of added bits may be decided based on the maximum number of IMRs or the configurations of IMRs. Or, aperiodic CSI request 2 bits may be reused such that a UE may be configured to use the following or similar table to refer when CSI request field is present assuming three IMRs can be configured.

As following Table 8, the UE may be triggered when CSI request bit field is 2 bits and is triggering aperiodic CSI report for one serving cell with Dynamic IMR mapping is enabled in transmission mode 9 (or a TM using DCI format 2C in new carrier type).

TABLE 5

| Value of CSI request field | Description |
| --- | --- |
| '00' | No aperiodic CSI report is triggered |
| '01' | Aperiodic CSI report is triggered for serving cell c with IMR index = 0 |
| '10' | Aperiodic CSI report is triggered for serving cell c with IMR index = 1 |
| '11' | Aperiodic CSI report is triggered for serving cell c with IMR index = 2 |

Figure 6:
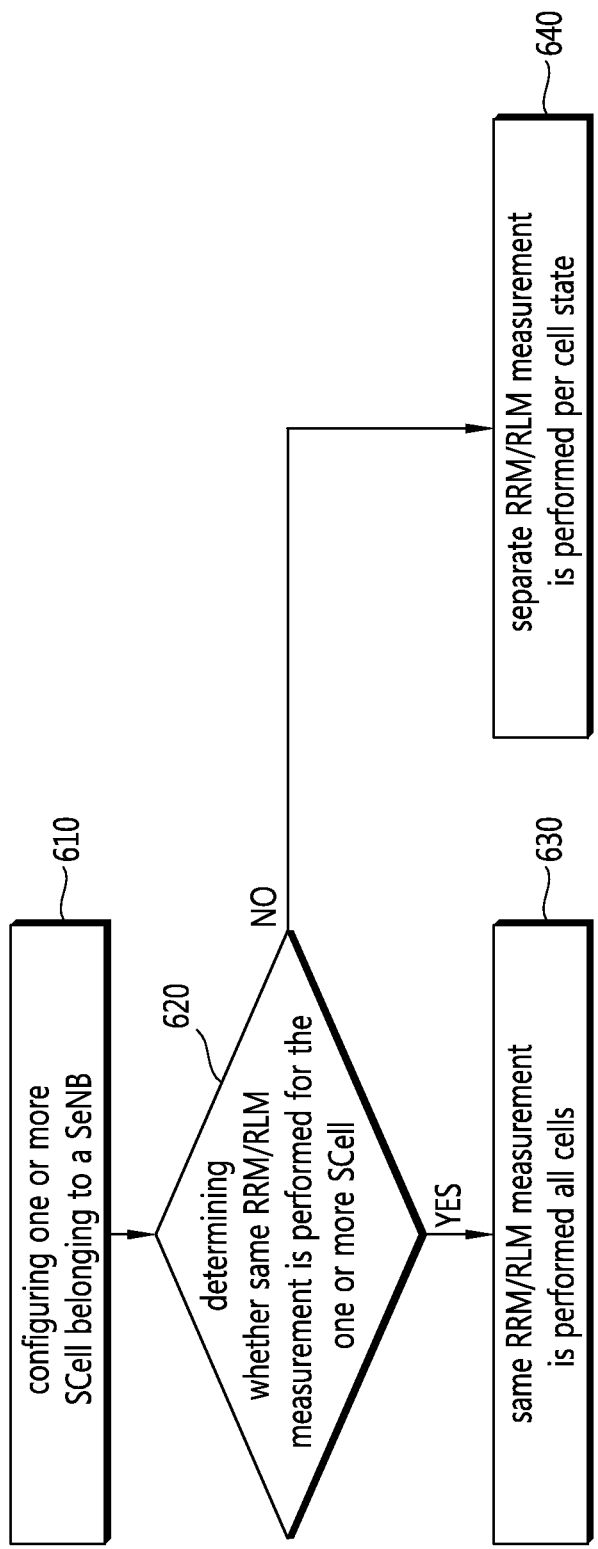
FIG. 6 and FIG. 7 show an exemplary flow chart for determining RRM/RLM measurement according to an embodiment of the present invention.
Figure 7:
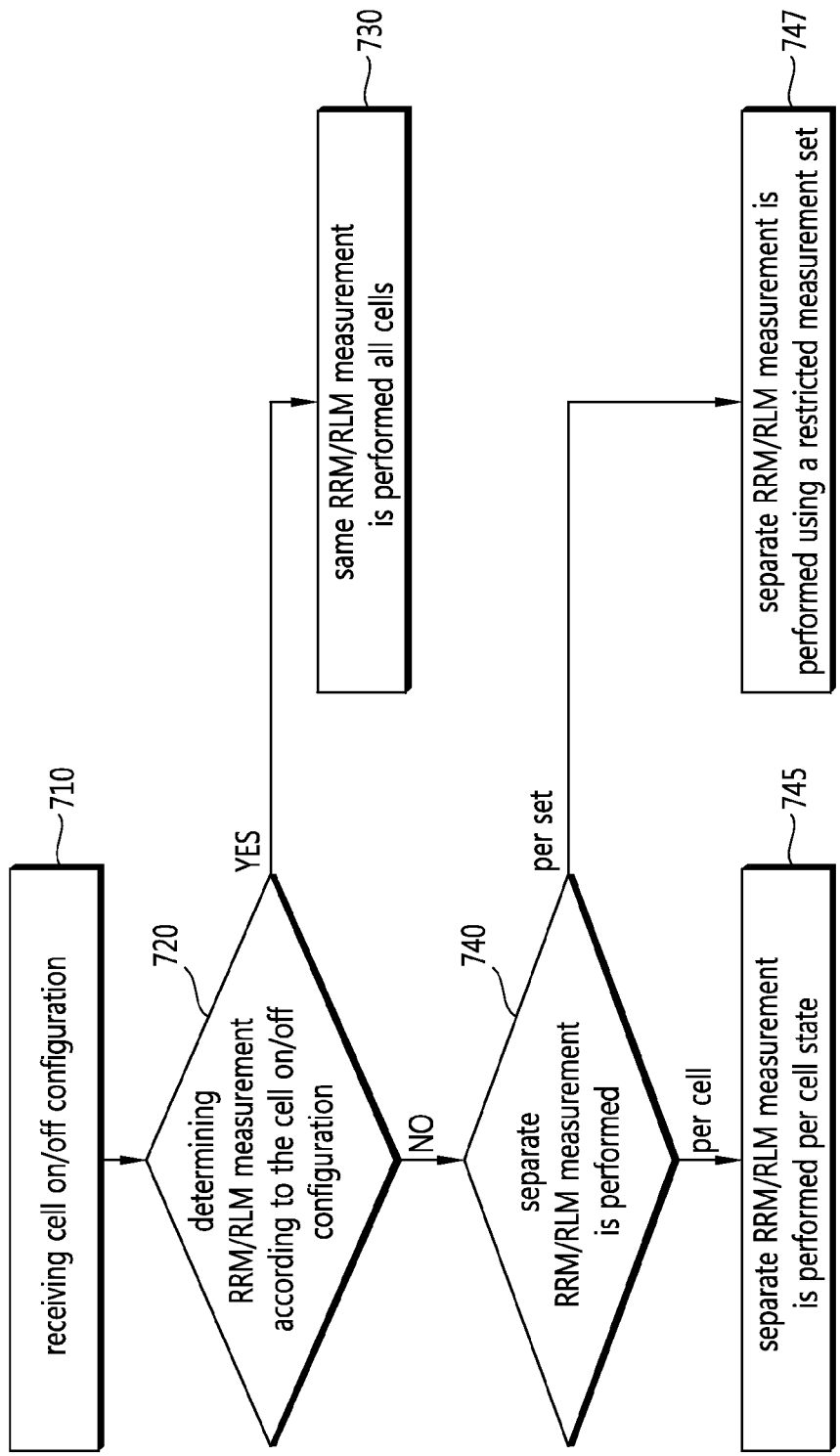

As described, FIG. 6 and FIG. 7 show an exemplary flow chart for determining RRM/RLM measurement according to an embodiment of the present invention.

Different possibilities of UE measurement when cell on/off is applied are supported. Firstly, the UE can determine whether a cell is on state or off state for the restricted measurement by receiving a signal including a measurement configuration configured based on a cell on/off indicator or a signal separated for indicating the cell on/off. A signal for Scell activation/deactivation or Scell configuration can be used for the cell on/off indication such that when a cell is activated, UE may assume the cell is on-state.

Referring to FIG. 6, it is a case that cell on/off is not known or explicitly signaled to the UE in which case the UE may assume that the cell is always on. The UE is configuring one or more SCell belonging to a SeNB (610). The UE can add/release a Scell by receiving a Scell configuration. After then, the UE can determine whether same RRM/RLM measurement is performed for the one or more SCells by checking a measurement object according to a corresponding Scell. That is the UE determines that same RRM/RLM is performed regardless of on/off (620). When same RRM/RLM measurement is performed all cells, the UE can apply a restricted measurement of RLM and RRM on the serving cell(s) at a subframe configured based of the Pcell (630).

If separate RRM/RLM measurement is performed per cell state, the UE performs measurement by detecting at least measurement signal transmitted from the one or more SCells at one or more subframes configured according to a measurement target cell or cells. Herein the measurement configuration comprises the measurement object including a bandwidth predetermined according to a corresponding Scell and a restricted measurement configuration includes a measurement period and offset, and/or location based on cell ID and SFN (640).

Referring to FIG. 7, it is a case that cell on/off is known to the UE. The UE is configuring one or more SCell belonging to a SeNB and receiving cell on/off configuration for the one or more SCell (710). The UE can determine whether RRM/RLM measurement is performed commonly or differently based on the cell on/off configuration (720). When same RRM/RLM measurement is performed all cells, the UE can apply a restricted measurement of RLM and RRM on the serving cell(s) at a subframe configured based of the Pcell (730). One of the invention of separate RRM/RLM depending on cell state is to utilize different measurement signals available in each state.

For example, CSI-RS based discovery signal is used for measurement when the cell is off-state whereas CRS based measurement signal is used for measurement when the cell is on-state. Since density of CRS is higher than that of CSI-RS, measurement accuracy in on-state in general improves compared to measurement accuracy in off-state. Since serving cell quality is important to be measured, in particular for radio link monitoring procedure as well, better measurement accuracy in on-state is desirable. To support this, implicit/explicit indication of cell on/off state would be beneficial. Furthermore, measurement based on discovery signals can be further refined by measurement RS transmitted in on-state (such as CRS) for the candidate serving cell before cell association to make it sure the serving cell quality exceeds the desired.

When a separate RRM/RLM measurement is performed, the UE can further check whether the RRM/RLM measurement using a restricted measurement set is performed or not (740).

If separate RRM/RLM measurement is performed per cell state (745), the UE performs measurement by detecting at least measurement signal transmitted from the one or more SCells at one or more subframes configured according to a measurement target cell or cells. Herein the measurement configuration comprises the measurement object including a bandwidth predetermined according to a corresponding Scell and a restricted measurement configuration includes a measurement period and offset, and/or location based on cell ID and SFN.

Whereas, if separate RRM/RLM measurement is performed using a restricted measurement set (747), the UE may perform a separate RLM per configured restricted measurement set, a separate timer and indication may be defined respectively, this may be associated with cell state on or off. The restricted measurement set is configured for ABS, for the restricted measurement set is explained more details as below. Wherein the measurement signal includes a discovery signal (PSS/SSS, or TRS), or a measurement reference signal (or MRS) for the restricted measurement. Also, the UE may perform a separate RLM measurement per the restricted measurement set having separate timers and offsets. For example, RLM on SCell in restricted measurement set may trigger RLF, the RLF may ignore or report to PCell instead of the SCell as PCell.

To support power efficient cell detection/discovery mechanisms, a coordinated transmission of discovery signals from multiple neighbor cells can be considered assuming cells are synchronized. Thus, coordination among cells to configure discovery signal transmission is necessary. In other words, the discovery signal multiplexing among neighbor cells can be applied in this invention. The coordination message may include discovery signal resource configuration and discovery signal transmission.

Firstly, the discovery signal resource configuration is necessary to avoid interference and maximize multiplexing, orthogonal resource allocation for discovery signal. Thus, selection and configuration of discovery signal resource needs to be coordinated among cells. One example of discovery signal is CSI-RS and then discovery signal resource can follow CSI-RS configuration. Assuming CSI-RS based discovery signal transmission, the discovery signal resource configuration should include both transmitting and muting REs. Since discovery signal may be transmitted along with data transmission, the UE needs to know the rate matching pattern. So, this invention proposes a signaling including a ZP-CSI-RS configuration which includes a set of CSI-RS resources used by neighbor cells discovery signal transmission to legacy UE.

For example, if three neighbor cells use CSI reference configuration 0, 1 and 2 respectively, a UE served by any cell among three will be configured with ZP-CSI-RS configuration of {1, 1, 1, 0, . . . . } indicates that resource used for CSI-RS configuration 1, 2, 3 will be zero-powered. For advanced UE, the list of CSI-RS or discovery signal configurations may be given so that it assumes that discovery signals will be transmitted there. In terms of discovery signal resource configuration, a fixed configuration may be configured per cell or a set of resources will be reserved for discovery signal transmission which will be used by small cells within a small cell cluster use to multiplex multiple discovery signal transmissions.

And the discovery signal transmission can be included. If a set of resources is reserved for discovery signal transmission, a location of discovery signal from each cell may be changed over the time. The location of each cell's discovery signal may be determined based on cell ID and SFN.

When a restricted measurement set is configured, a UE is expected to perform RLM on the restricted measurement set as well when the restricted measurement is configured for PCell. As proposed in this invention, if additional restricted measurement set is configured, either for PCell or SCell, it is necessary to define the UE behavior on RLM.

If separate RLM per restricted measurement set is configured, the UE may perform a separate RLM per configured restricted measurement set. Separate timer and indication/behavior once RLF occurs may be defined respectively. For example, RLM on SCell restricted measurement set may trigger RLF which will be reported to PCell instead of reporting to SCell as PCell is in charge of mobility.

Another approach is to configure UE to select one restricted measurement set for performing RLM. For this, a measurement set to be used for RLM measurement is configured. Furthermore, this may be associated with cell state as well. For example, the first restricted measurement set is used for RLM when cell is on-state whereas the second restricted measurement set is used for RLM when cell is off-state. More specifically, when a UE is in DRX, the second restricted measurement set is used for RLM and a UE is in active state (continuous reception period), the first restricted measurement set is used. This can be triggered once a UE detects PDCCH for itself during OnDuration. Or, a UE may use the first set when DRX is not configured. And it uses the second set when DRX is configured. Related to DRX operation, a UE may not expect to receive PDCCH and/or CRS in OnDuration when it knows that the cell is off-state. For this, a separate DTX configuration is also feasible where DTX configuration refers the schedule of cell on and off state. This can be a cell-common signal. When a UE is configured with DRX and configured with two measurement sets, a UE may assume that it can perform RRM and/or RLM in subframes configured by either measurement sets regardless of DRX state. Or, the first set may be limited to be used when a UE is in ON state. Thus, when a UE is configured with DRX, it should not assume that measurement can be performed in any subframe configured in the first restricted measurement set.

The other option is to use RLM only in subframe where a UE monitors PDCCH (or e PDCCH) regardless of measurement set configuration. When a UE is configured to monitor a set of subframes for ePDCCH, a UE may assume that it can perform RLM on those subframes. The actual configuration can be form of SCell activation or DRX configuration or measurement set configuration. Whenever, a UE can monitor (e)PDCCH, it can perform RLM functionality as well.

When a restricted measurement set is configured for a SCell, a UE may assume that separate RLM is performed for that SCell in addition to RLM on PCell where RLM is performed based on measurement RS type specified in the measurement set (or based on pre-configuration or by rule) in those configured subframes.

Furthermore, when a dual connectivity is configured with cell on/off as potentially included, the followings are some UE behavior expectations. If a UE is configured with another restricted measurement set for SCell, more specifically, this SCell can be a PCell-like cell to which the UE transmits PUCCH (e.g., Super SCell or master SCell). Once this set is configured, a UE performs RRM and/or RLM on PCell and/or Super SCell following the restricted measurement sets configured for each. When RLF occurs for SSCell or Super SCell, it will be reported back to PCell.

More specifically, this set for SSCell can be a set representing the configuration for discovery signal transmission.

If a UE may be configured with another restricted measurement set for RRM and/or RLM for any cell. Once it is configured, selection of either sets can be higher-layer signaled or can be associated with DRX configuration or cell state. More specifically, when DRX is not configured, restricted measurement set 0 configured for PCell may be used for SCell RRM/RLM measurement. In other words, the same measurement pattern can be applied to SCell as well when DRX is not configured. If DRX is configured, the measurement set configured for SSCell is used for RRM/RLM. Alternatively, when cell is on-state, restricted measurement set 0 configured for PCell may be used for SCell RRM/RLM measurement. When cell is off-state, restricted measurement set configured for SSCell is used for RRM/RLM.

To support flexible interference measurement, the UE may be configured to report RRM measurement per resource block (RB) or resource block group (RBG) within the measurement bandwidth. Assuming the measurement bandwidth is 6RB, once the flag of RRM Per RB is triggered, UE is expected to report RSRQ per RB for the serving cell or the measurement target cell. To measure RSRQ per PRB, UE takes different approaches. First, UE can measure RSRP over the measurement bandwidth and measure RSSI per PRB to get RSRQ per PRB. Alternatively, the UE can measure RSRP over each PRB and measure RSSI per each PRB to get RSRP per PRB. Herein the RSRP and RSRQ can be reported as normal and the set of RSSI per PRB within a measurement bandwidth can be reported separately.

Furthermore, the options to trigger this RSRQ and/or RSSI measurement is to either trigger of the RRM Per RB flag in the measurement request (trigger per measurement object) or triggered applied to all RRM measurement once higher layer triggering has occurred or UE may assume RRM per PRB is used as default when it detects discovery signal and use discovery signals for RRM measurement instead of regular synchronization channels and reference signals such as PSS/SSS and cell specific RS. Or, additional RSRQ per RB or RSSI per RB can be defined so that it will be reported by the UE if it is configured to report it.

Similarly, this invention is applied to measurement per subframe. To support this, the number of subframes used for one RRM measurement is defined in addition to measurement bandwidth where RSRQ (and/or RSSI) is reported per each subframe within the measurement subframes separately rather than averaged. For example, measurement subframe is 5, then it starts with subframe #0 to subframe #4 and RRM measurement per each subframe (#0 to #4) will be reported separately. It is up to implementation to choose how many and which radio frames for the measurement.

Figure 8:
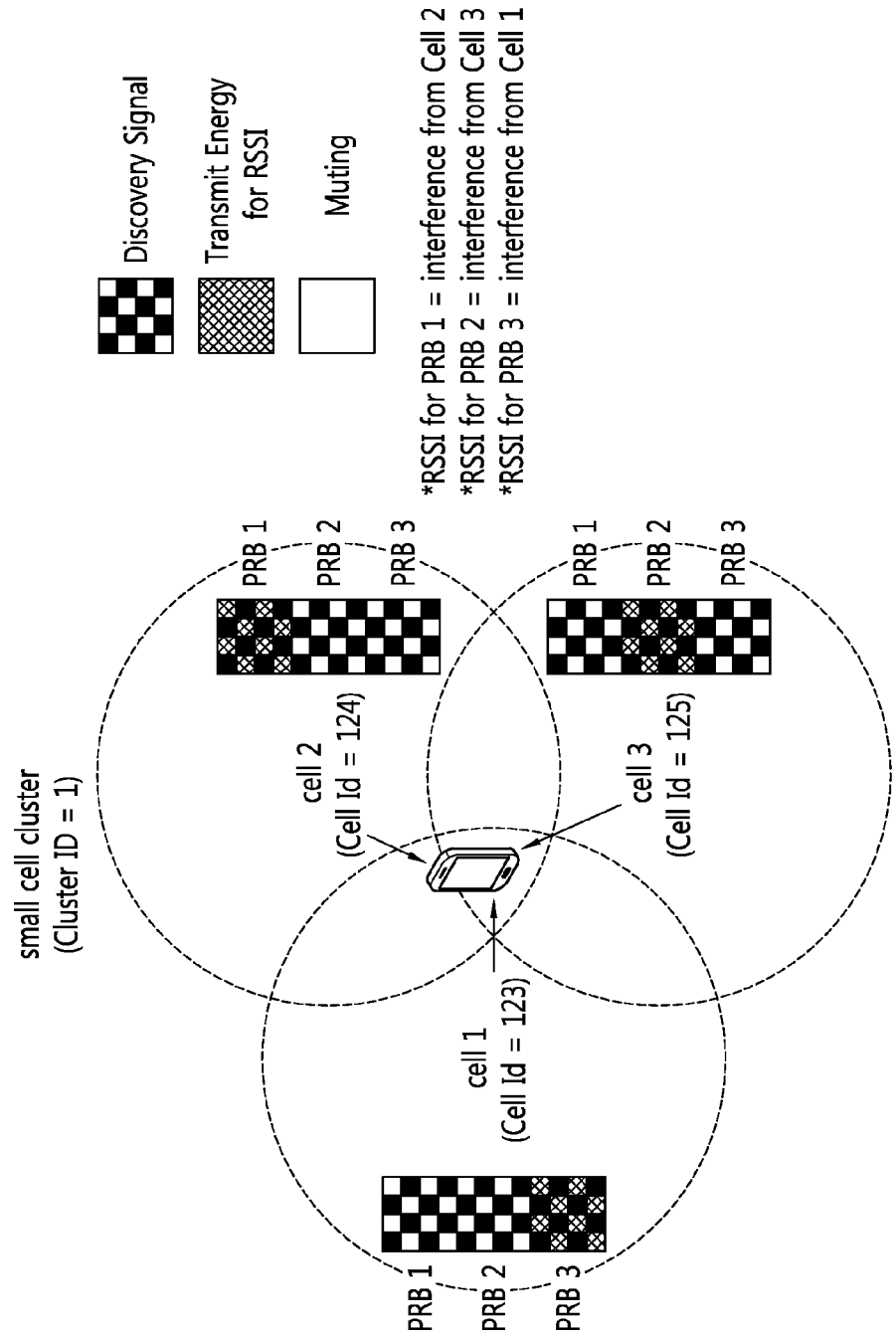
FIG. 8 and FIG. 9 show exemplary RRM measurements per RB according to an exemplary embodiment of the present invention.
Figure 9:
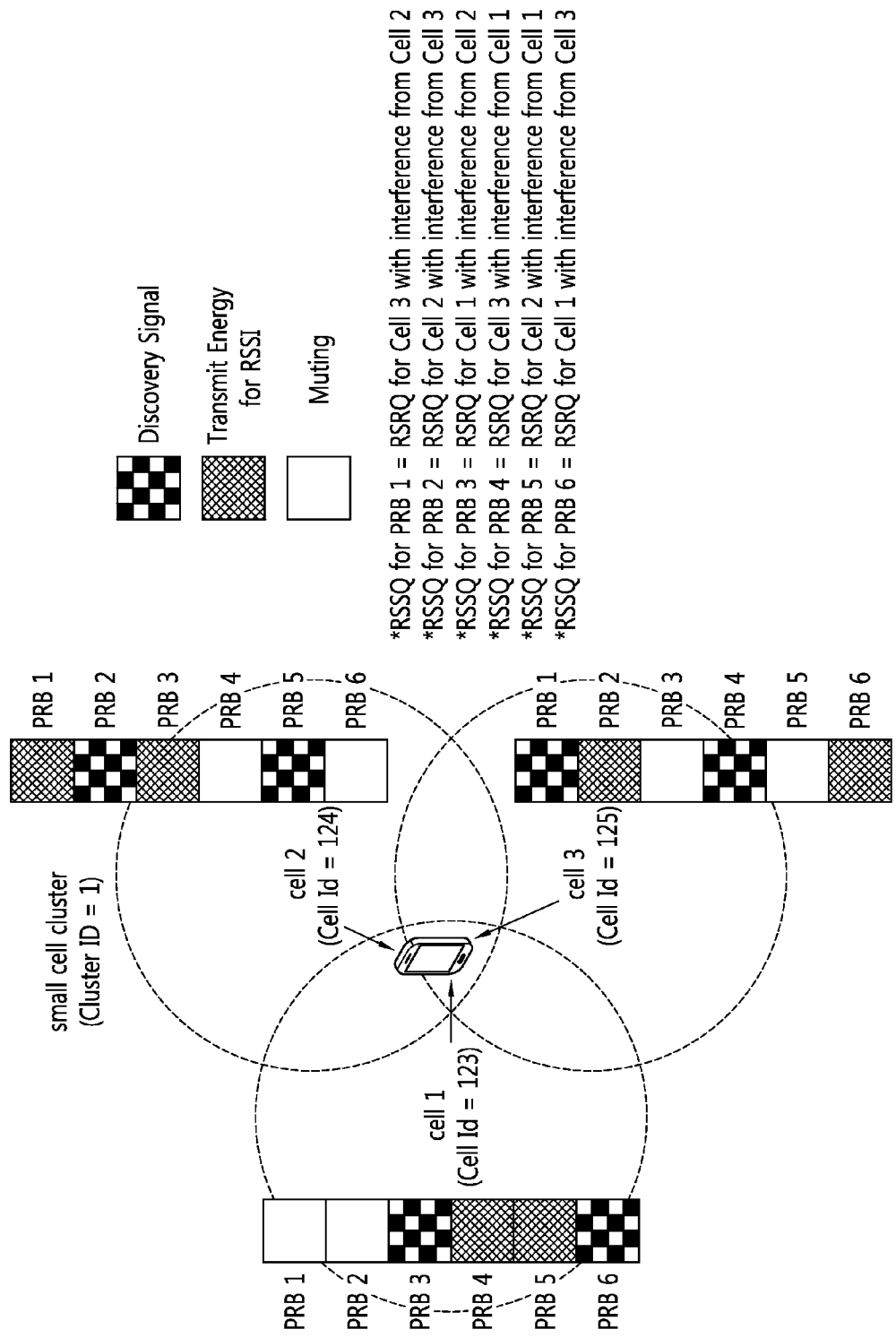

FIG. 8 and FIG. 9 show exemplary RRM measurements per RB according to an exemplary embodiment of the present invention.

Referring to FIG. 8, it shows an example of RSSI per PRB. The reported RSSI per PRB can be used to infer interference from neighbor cell when the serving cell and neighbor cells are coordinated to mute a subset of PRBs in the measurement subframe. For example, the UE check and measure that the RSSI per PRB 1 is similar to interference from Cell 2 since the Cell 3 is muted with the subset of PRBs in the measurement subframe. The UE check and measure that the RSSI per PRB 2 is similar to interference from Cell 3 since the Cell 1 is muted with the subset of PRBs in the measurement subframe. The UE check and measure that the RSSI per PRB 3 is similar to interference from Cell 1 since the Cell 2 is muted with the subset of PRBs in the measurement subframe.

And FIG. 9 shows an example of RSRQ per PRB for three small cells case. If a subset of subframes is used for RRM measurement in a synchronized network, a subframe carried discovery channel is used for RRM measurement, a UE is expected to take subframes which carry discovery channels only rather than a random selection. Further, it can be assumed that those subframes carry CSI-RS resource as well. Further, it is assumed that a cluster (a set of multiple cells) may share the same discovery channel sequence where each cluster is identified by different discovery signal.

For example, discovery channel can distinguish up to N clusters (e.g., 24 clusters). The cluster ID can be used for the most significant 6 bits of cell ID where the three least significant bits are used for a unique ID within a cluster. For example, cell ID=503 (111110111) represents cluster ID=62 and the ID within the cluster=7. For a convenient RRM measurement within a subframe, the UE may be requested to report. When RSRQ for the cluster is used, the RSRP measured over discovery signals, RSSI over OFDM symbols carried discovery signals (or over all OFDM symbols). When individual RSRQ per cells within the cluster can be used, each cell within a cluster transmits energy on a CSI-RS resource where CSI-RS resource elements corresponding to the four CSI reference signal for normal and extended CP respectively where the CSI RS configuration index is determined by ID within a cluster % M (e.g., M=8 which is the maximum number of IDs differentiated within a cluster). Note that cluster ID will be used for generating CSI-RS sequence and thus UE can identify each cell only by the location of CSI-RS resource.

Furthermore, other CSI-RS resource elements will be muted. For example, cell ID=503 and M=8, then CSI RS configuration 7 will be used for CSI-RS transmission and CSI RS configuration 0-6 resource elements by cell ID=503 will be muted. By measuring RSRP at CSI RS configuration 7 with IMR=CSI RS configuration 0-6, UE may be able to measure RSRQ for the cell ID=503 cell. UE will report up to M RSRQ. When discovery signal and CSI RS configuration 0-(M−1) collide, discovery signal may not be transmitted. Or, additional REs can be defined which are not colliding with discovery signals for individual RSRQ measurement purpose within a cluster.

Alternatively, it can be assumed that whenever a UE is configured to read PDCCH or discovery signal, UE can perform measurement. For example, a UE may perform measurement on discovery signal transmission subframes and DRX on durations and subframes activated by SCell activation or PCell association. If a UE performs intra-frequency and/or inter-frequency measurement based on discovery signal or measurement RS, it may be further assumed that the frequency and location of those RS for neighbor cells may be known to UE via explicit signaling or implicit signaling.

One way to achieve this invention is to align transmission of discovery signals among neighbor cells via network synchronization or alignment such that a UE at subframes configured for serving cell measurement can perform neighbor cell measurement as well for intra-frequency. In other subframes, UE shall not assume that measurement signals will be transmitted. To support this, it is desirable to support short-term measurement where a UE perform measurement based on measurement RS over only a few subframes and over a short-time period. However, this measurement may not be so effective to determine hand-over decision as it may capture short-term measurement where long-term average measurement may be different.

Thus, without tighter accuracy, short-term measurement may lead fluctuating measurement reports which may cause ping-pong effects if used for hand-over decisions. Thus, it is desirable to achieve the same or superior performance with new discovery signal or measurement RS compared to legacy performance using CRS. Another potential problem with measurement RS based measurement also includes the case where measurement captures only interference from discovery signals if all cells are off-state or muting is applied. Assuming small cells are synchronized within a cluster and small cells transmit CSI-RS based measurement/discovery signals in a subframe simultaneously. IMR or ZP-CSI-RS can be utilized to enhance the performance of discovery signals in this case. In terms of measuring RSRP, only symbols/REs carrying CSI-RS can be used. For RSSI, however, it becomes tricky as muting applied. One way is to assign IMR per each cell so that RSSI is measured from the configured IMR.

In other words, for the configured IMR for a specific cell, only the specific ell will transmit data whereas other cells will perform muting. Thus, by reading signal strength at the configured IMR, UE can measure the potential interference level from the specific cell. If this is used, the number of needed IMR configurations can be high with large number of neighbor cells. Another approach is to assign 1 specific IMR?which is used for all cells to create interference except for a specific cell which will transmit CSI-RS based discovery signal for example. Thus, for a discovery signal from a cell has a pair of CSI-RS and IMR resource configurations where CSI-RS resource positions will be muted by other cells and IMR resource positions will be used for transmission by other cells. When multiple cells exist in a small cell cluster, there could be multiple CSI-RS configuration as well as multiple IMR configurations are necessary.

Figure 10:
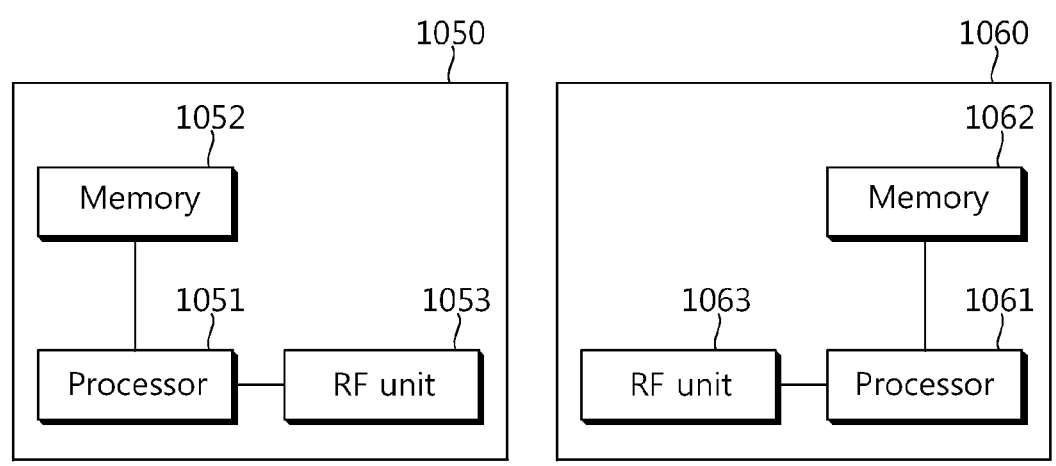
FIG. 10 shows a block diagram showing a wireless communication system according to an exemplary embodiment of the present invention.

FIG. 10 is a block diagram showing a wireless communication system according to an embodiment of the present invention.

ABS 1050 includes a processor 1051, a memory 1052, and a radio frequency (RF) unit 1053. The memory 1052 is coupled to the processor 1051, and stores a variety of information for driving the processor 1051. The RF unit 1053 is coupled to the processor 1051, and transmits and/or receives a radio signal. The processor 1051 implements the proposed functions, procedures, and/or methods. In the embodiments of FIG. 2 to FIG. 9, the operation of the BS can be implemented by the processor 1051.

Especially, the processor 1051 may configure one or more Scells with different frequencies, for this invention the processor 1051 configures measurement configurations for the one or more Scells. The measurement configurations are used for performing measurement on a discovery signal or MRS transmission subframes based on SCell activation or cell on/off. Also the processor 1051 may configure a CSI-RS configuration for the RRM measurements, the RRM measurement is set per RB according to measurement target cell, and a subset of PRBs is configured for the RRM measurements. In other words, the processor 1051 may configure measurement configuration including an advanced measurement object for the restricted measurement and a legacy measurement object, and indicate a measurement type to support to perform the measurement adaptively by the UE.

Herein, the processor 1051 may also generate a measurement set including RLM and RRM measurement for a Pcell of a macro eNB (Master eNB) and RLM and RRM measurement for a Super SCell or a Master SCell of a pico eNB (serving eNB). Also, the measurement set includes measurement signal type, a bandwidth and/or frequency/PRBs, measurement period and/or offset, cell ID, a number of subframes in a measurement RS according to a measurement target cell or an each configured set. So the processor 1051 may control to transmit a CRS/TRS or CSI-RS or other RS used for MRS at configured subframes with predetermined PRB. Herein the processor 1051 may configure an ABS pattern for the restricted subframe (or restricted subframes) for RRM (and/or RLM).

And the processor 1051 may configure a restricted measurement that a first pattern is used for a restricted measurement of radio link monitoring (RLM) and Radio Resource Management (RRM) for a PCell, a second pattern is used for a restricted measurement of RRM on a cell indicated by a Physical Cell ID (PCI), or a third pattern is used for a restricted Channel State Information (CSI) measurement.

The wireless device 1060 includes a processor 1061, a memory 1062, and an RF unit 1063. The memory 1062 is coupled to the processor 1061, and stores a variety of information for driving the processor 1061. The RF unit 1063 is coupled to the processor 1061, and transmits and/or receives a radio signal. The processor 1061 implements the proposed functions, procedures, and/or methods. In the embodiments of the FIG. 2 to FIG. 9, the operation of the UE can be implemented by the processor 1061.

Especially, the processor 1061 may configure one or more cells with different frequencies, for this invention the processor 1061 configures adaptive measurement set including an advanced measurement object for the restricted measurement and a legacy measurement object and performs measurement using a measurement signal at a subframe configured in the restricted measurement according to a measurement type in a measurement configuration.

The processor 1061 may receive and check a measurement signal such as a discovery signal or a measurement reference signal (MRS) including CRS/TRS (or CSI-RS) at a predetermined PRB or resources. Also the processor 1061 may receive a measurement signal at a bandwidth predetermined according to a measurement target cell. The processor 1061 may performs the measurement by considering that a cell is on state or off state for the restricted measurement.

The processor 1061 may check that restricted measurement includes that a first pattern is used for a restricted measurement of radio link monitoring (RLM) and Radio Resource Management (RRM) for a PCell, a second pattern is used for a restricted measurement of RRM on a cell indicated by a Physical Cell ID (PCI), or a third pattern is used for a restricted Channel State Information (CSI) measurement. Also the measurement set includes a set including a measurement of RLM and RRM for a Pcell of a first eNB as Macro eNB, and a measurement of RLM and RRM for a Super SCell or a Master SCell of a serving eNB.

More details, the wireless device 1060 includes identifying information about a measurement type, the measurement type indicating one of a first measurement object and a second measurement object. so the wireless device 1060 performs measurement using a measurement signal for the measurement object indicated by the measurement type. Of course, the wireless device 1060 can receive and determine a measurement configuration from a base station, the measurement configuration including cell information and information about the first measurement object and the second measurement object, the cell information indicating a cell to which the first measurement object or the second measurement object is applied. Wherein the wireless device 1060 can determine that the first measurement object including a first subframe field and a first measurement resource field, the first subframe field indicating at least one subframe among a plurality of subframes in which the measurement is performed, the first measurement resource field indicating a resource block in which the measurement is performed, the second measurement object including a second subframe field and a second measurement resource field, the second subframe field indicating at least one subframe among a plurality of subframes in which the measurement is performed, the second measurement resource field indicating a resource block in which the measurement is performed. Here, the wireless device 1060 can determine that a number of subframes indicated by the first subframe field is greater than a number of subframes indicated by the second subframe field.

Also the wireless device 1060 can receive the information about the measurement type from the BS or acquire the measurement type by detecting the measurement signal including one of a discovery signal, a measurement reference signal (MRS) and a cell-common RS (CRS) and determined to apply the restricted measurement. The restricted measurement with the first measurement object is applied for one of a restricted measurement of radio link monitoring (RLM) and Radio Resource Management (RRM) for a Primary cell (Pcell), a restricted measurement of RRM on a cell indicated by a Physical Cell ID (PCI), or a restricted Channel State Information (CSI) measurement.

Also, the first measurement object includes a set configuring a measurement of RLM and RRM for a Primary cell of a first base station and a measurement of RLM and RRM for a Super serving cell (Scell) or a Master SCell of a second base station. Or, a measurement object for the measurement of RLM and RRM for the Super SCell or the Master SCell of the second base station is configured separately from the first measurement object of the a measurement of RLM and RRM for the Primary cell of the first base station. The wireless device 1060 can performs the measurement includes measuring a Reference signal received power (RSRP) or a Reference Signal Received Quality (RSRQ).

Wherein the wireless device 1060 can determine, when the measurement type indicates the first measurement object, the cell indicated by the cell information is a discontinuous transmission (DTX) cell for the measurement signal, and when the measurement type indicates the second measurement object, the cell indicated by the cell information is a continuous transmission cell for the measurement signal.

Also, wherein the wireless device 1060 can determine, when the measurement type indicates the first measurement object, the cell indicated by the cell information is a de-activated cell, and when the measurement type indicates the second measurement object, the cell indicated by the cell information is a activated cell. Or, the wireless device 1060 can determine, when the measurement type indicates the first measurement object, the cell indicated by the cell information is an off state cell for receiving the measurement signal, and when the measurement type indicates the second measurement object, the cell indicated by the cell information is an on state cell for receiving the measurement signal.

The processor may include application-specific integrated circuit (ASIC), other chipset, logic circuit and/or data processing device. The memory may include read-only memory (ROM), random access memory (RAM), flash memory, memory card, storage medium and/or other storage device. The RF unit may include baseband circuitry to process radio frequency signals. When the embodiments are implemented in software, the techniques described herein can be implemented with modules (e.g., procedures, functions, and so on) that perform the functions described herein. The modules can be stored in memory and executed by processor. The memory can be implemented within the processor or external to the processor in which case those can be communicatively coupled to the processor via various means as is known in the art.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

The invention claimed is:

1. A method for performing a measurement at a user equipment (UE) in a mobile communication system, the method comprising:
   receiving, at the UE from a primary cell, measurement configuration information of a discovery signal of a secondary cell in an off-state; and
   based on the measurement configuration information, measuring, at the UE, a Reference Signal Received Power (RSRP) or a Received Signal Strength Indicator (RSSI) of the discovery signal,
   wherein the measurement configuration information indicates a frequency of the discovery signal, a periodicity of the discovery signal, and a subframe offset of the discovery signal,
   wherein the measurement configuration information further indicates that the UE should not assume to receive a cell reference signal (CRS) within a subframe except for a subframe configured to receive the discovery signal, and
   wherein the measurement configuration information is received via a radio resource control (RRC) message.

2. The method of claim 1, wherein the off-state is a state where no UE is currently attached to the secondary cell.

3. The method of claim 1, wherein the discovery signal is transmitted only from the secondary cell in the off-state.

4. The method of claim 1, wherein the received CRS from the secondary cell is not used for a data demodulation.

5. The method of claim 1, further comprising:
   based on the measuring, transmitting information indicating that a base station should cause the secondary cell to change from the off-state to an on-state for handover.

6. The method of claim 5, wherein the on-state corresponds to a state where the secondary cell transmits synchronization signals.

7. The method of claim 1, wherein the off-state corresponds to a state where the secondary cell transmits the discovery signal in one or more subframes allocated for an on-state synchronization signal.

8. The method of claim 1, wherein the off-state corresponds to a state where the secondary cell transmits the discovery signal in one or more subframes allocated for an on-state cell-reference signal.

9. The method of claim 1, wherein a pattern of the discovery signal associated with the off-state corresponds to a reference signal pattern associated with an on-state.

10. The method of claim 1,
    wherein the frequency of the discovery signal indicates a specific frequency for which the measurement configuration information is valid, wherein the periodicity of the discovery signal indicates a periodicity of the discovery signal measurement timing configuration, and wherein the subframe offset of the discovery signal indicates a specific offset of the measurement timing configuration of the discovery signal in a number of subframe(s).

11. A user equipment (UE) performing a measurement in a mobile communication system, the UE comprising:
   a transceiver configured to receive a radio signal; and
   a processor configured to:
      receive, from a primary cell, measurement configuration information of a discovery signal of a secondary cell in an off-state; and
      based on the measurement configuration information, measure a Reference Signal Received Power (RSRP) or a Received Signal Strength Indicator (RSSI) of the discovery signal,
      wherein the measurement configuration information indicates a frequency of the discovery signal, a periodicity of the discovery signal, and a subframe offset of the discovery signal,
      wherein the measurement configuration information further indicates that the UE should not assume to receive a cell reference signal (CRS) within a subframe except for a subframe configured to receive the discovery signal, and
      wherein the measurement configuration information is received via a radio resource control (RRC) message.

12. The UE of claim 11, wherein the off-state is a state where no UE is currently attached to the secondary cell.

13. The UE of claim 11, wherein the discovery signal is transmitted only from the secondary cell in the off-state.

14. The UE of claim 11, wherein the received CRS from the secondary cell is not used for a data demodulation.

15. The UE of claim 11, wherein, based on the measuring, the processor is further configured to transmit information indicating that a base station should cause the secondary cell to change from the off-state to the to an on-state for handover.

16. The UE of claim 15, wherein the on-state corresponds to a state where the secondary cell transmits synchronization signals.

17. The UE of claim 11, wherein the off-state corresponds to a state where the secondary cell transmits the discovery signal in one or more subframes allocated for an on-state synchronization signal.

18. The UE of claim 11, wherein the off-state corresponds to a state where the secondary cell transmits the discovery signal in one or more subframes allocated for an on-state cell-reference signal.

19. UE of claim 11, wherein a pattern of the discovery signal associated with the off-state corresponds to a reference signal pattern associated with an on-state.

20. The UE of claim 11,
   wherein the frequency of the discovery signal indicates a specific frequency for which the measurement configuration information is valid,
   wherein the periodicity of the discovery signal indicates a periodicity of the discovery signal measurement timing configuration, and
   wherein the subframe offset of the discovery signal indicates a specific offset of the measurement timing configuration of the discovery signal in a number of subframe(s).

* * * * *